United States Patent [19]

Boutet et al.

[11] Patent Number: 5,278,410

[45] Date of Patent: Jan. 11, 1994

[54] X-RAY CASSETTE POSITIONER AND COGBELT FOR USE THEREWITH

[75] Inventors: John C. Boutet; James F. Owen, both of Rochester; John E. Becker, Victor, all of N.Y.; Gary Unruh, Felton, Calif.

[73] Assignees: Eastman Kodak Company, Rochester, N.Y.; Lumisys, Inc., Sunnyvale, Calif.

[21] Appl. No.: 902,214

[22] Filed: Jun. 22, 1992

Related U.S. Application Data

[63] Continuation-in-part of Ser. No. 800,800, Nov. 27, 1991, abandoned.

[51] Int. Cl.$^5$ .......................................... G01N 23/04
[52] U.S. Cl. .................................. 250/589; 250/484.4
[58] Field of Search .................... 250/484.1, 327.2; 378/172

[56] References Cited

U.S. PATENT DOCUMENTS

| | | | |
|---|---|---|---|
| 3,756,371 | 9/1973 | Neil | 414/795.6 |
| 4,624,616 | 11/1986 | Freese | 414/795.7 |
| 4,739,166 | 4/1988 | Yoshimura et al. | 250/327.2 |
| 4,760,255 | 7/1988 | Kimura et al. | 250/327.2 |
| 4,789,782 | 12/1988 | Ohara | 250/327.2 |
| 4,855,599 | 8/1989 | Ohgoda et al. | 250/327.2 |
| 4,861,995 | 8/1989 | Ohgoda | 250/327.2 |
| 4,900,926 | 2/1990 | Yoshimura et al. | 250/327.2 |
| 4,915,578 | 4/1990 | Becker | 414/797.6 |
| 4,984,780 | 1/1991 | Saito et al. | 271/292 |
| 4,988,874 | 1/1991 | Muraishi | 250/327.2 |

FOREIGN PATENT DOCUMENTS

| 183447 | 8/1987 | Japan | 250/327.2 J |
|---|---|---|---|
| 183448 | 8/1987 | Japan | 250/327.2 J |

*Primary Examiner*—Carolyn E. Fields
*Attorney, Agent, or Firm*—Frank Pincelli

[57] ABSTRACT

An x-ray cassette positioner for use with a plurality of x-ray cassettes. The cassette positioner includes first and second conveyors. The conveyors have a first endless cogbelt and a second endless cogbelt, respectively. The cogbelts are spaced apart. The cogbelts each have a plurality of outwardly extending shelves. The conveyors each have a pair of cogwheels, each pair of cogwheels receives a respective cogbelt. The cogbelts each have a utilization segment and a return segment. The shelves of the utilization segment of said first cogbelt face and are in vertical alignment with corresponding shelves of the utilization segment of the second cogbelt. The aligned shelves define a cassette read site and a plurality of cassette loading sites. A positive drive is operatively connected to both conveyors and drives the conveyors in unison to transfer cassettes loaded in the loading sites serially through the loading sites and the read site. A body encases the conveyors. The body has a portal adjoining the cassette sites. The shelves of the cogbelts have an upper support surface for supporting a cassette of a first size and a lower support surface disposed below and adjacent the upper support surface for supporting a cassette of smaller size.

25 Claims, 20 Drawing Sheets

X-RAY CASSETTE POSITIONER AND COGBELT FOR USE THEREWITH

RELATED APPLICATIONS

This is a continuation-in-part of application Ser. No. 800,800 filed Nov. 27, 1991, now abandoned.

BACKGROUND OF THE INVENTION

The present invention pertains to equipment used in processing x-ray films and more particularly pertains to an x-ray cassette positioner and cogbelt for use therewith.

It is convenient to handle x-ray film within cassettes that protect the film from extraneous light and damage. This is particularly the case for storage phosphor films (also referred to as stimulable phosphor film) in which the film is read by photoelectrically detecting an image formed by scanning with stimulating radiation. An example of such a scanner-reader is disclosed in U.S. Pat. No. 4,789,782 to Ohara. It is desirable to retain the x-ray film within a cassette except during actual processing. Such an x-ray cassette is disclosed in a U.S. patent application cofiled with this application entitled "X-RAY CASSETTE HAVING REMOVABLE PHOTOGRAPHIC ELEMENT" by Jeffrey C. Robertson, which is incorporated herein by reference. A hooked extractor can be used with that x-ray cassette to move a photographic element to and from an x-ray reader for processing. It is desirable to provide an apparatus to automate the presentation of such x-ray cassettes or similar cassettes to such an extractor so that a number of x-ray cassettes could be processed in succession without attention from an operator. It is also desirable that such an apparatus be able to accurately position x-ray cassettes sequentially to simplify removal and reinsertion of the photographic elements and that the presentation apparatus be separate from the x-ray reader to permit interchange of units and reduce repair times.

X-ray cassettes can be relatively heavy and present a risk of mishap when carried unless the x-ray cassettes can be held with both hands in a horizontal position. It is desirable that a device for positioning x-ray cassettes to an extractor permit an x-ray cassette to be held horizontally with both hands during loading and unloading and thus, for simplicity, that the device transport x-ray cassettes in a horizontal orientation. U.S. Pat. No. 4,915,578 to Becker teaches a device, from another art, which transports horizontally oriented bins. The bins are moved by means of a pair of chain conveyors mechanically driven in unison. The device is loaded from the top with a stack of nested bins which are then dropped out the bottom one at a time onto a conveyor. It is desirable that an x-ray cassette positioner receive the cassettes one at a time and not dispense the x-ray cassettes, but rather hold them for manual unloading. Since exposed x-ray cassettes are not generic items, it is also desirable that it be possible to rearrange the order of the x-ray cassettes within the positioner, as requirements change.

X-ray cassettes typically come in a number of standard sizes, for example 11 by 14 inches, 10 by 12 inches, and 8 by 10 inches. It is also desirable that means be provided for accepting a plurality of different size cassettes with out any need to adjust or modify the apparatus.

SUMMARY OF THE INVENTION

Accordingly, it is an object and advantage of the invention to provide an x-ray cassette positioner which transports horizontally disposed x-ray cassettes and allows rearrangement of loaded x-ray cassettes. In the broader aspects of the invention there is provided an x-ray cassette positioner for use with a plurality of x-ray cassettes. The cassette positioner includes first and second conveyors. The conveyors have a first endless cogbelt and a second endless cogbelt, respectively. The cogbelts are spaced apart. The cogbelts each have a plurality of outwardly extending shelves. The conveyors each have a pair of cogwheels, each pair of cogwheels receives a respective cogbelt. The cogbelts each have a utilization segment and a return segment. The shelves of the utilization segment of said first cogbelt face and are in vertical alignment with corresponding shelves of the utilization segment of the second cogbelt. The aligned shelves define a cassette read site and a plurality of cassette loading sites. A positive drive is operatively connected to both conveyors and drives the conveyors in unison to transfer cassettes loaded in the loading sites serially through the loading sites and the read site. A body encases the conveyors. The body has a portal adjoining the cassette sites.

It is also an object of the present invention to provide means for accepting more than one size cassette. In this aspect of the invention, the shelves have a configuration which is designed to securely hold in place more than one size cassette. The shelves of the cogbelts have an upper support surface for supporting a cassette of a first size and a lower support surface disposed below and adjacent the upper support surface for supporting a cassette of smaller size.

The invention and its other objects and advantages will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF A SPECIFIC EMBODIMENT

Figure 1:
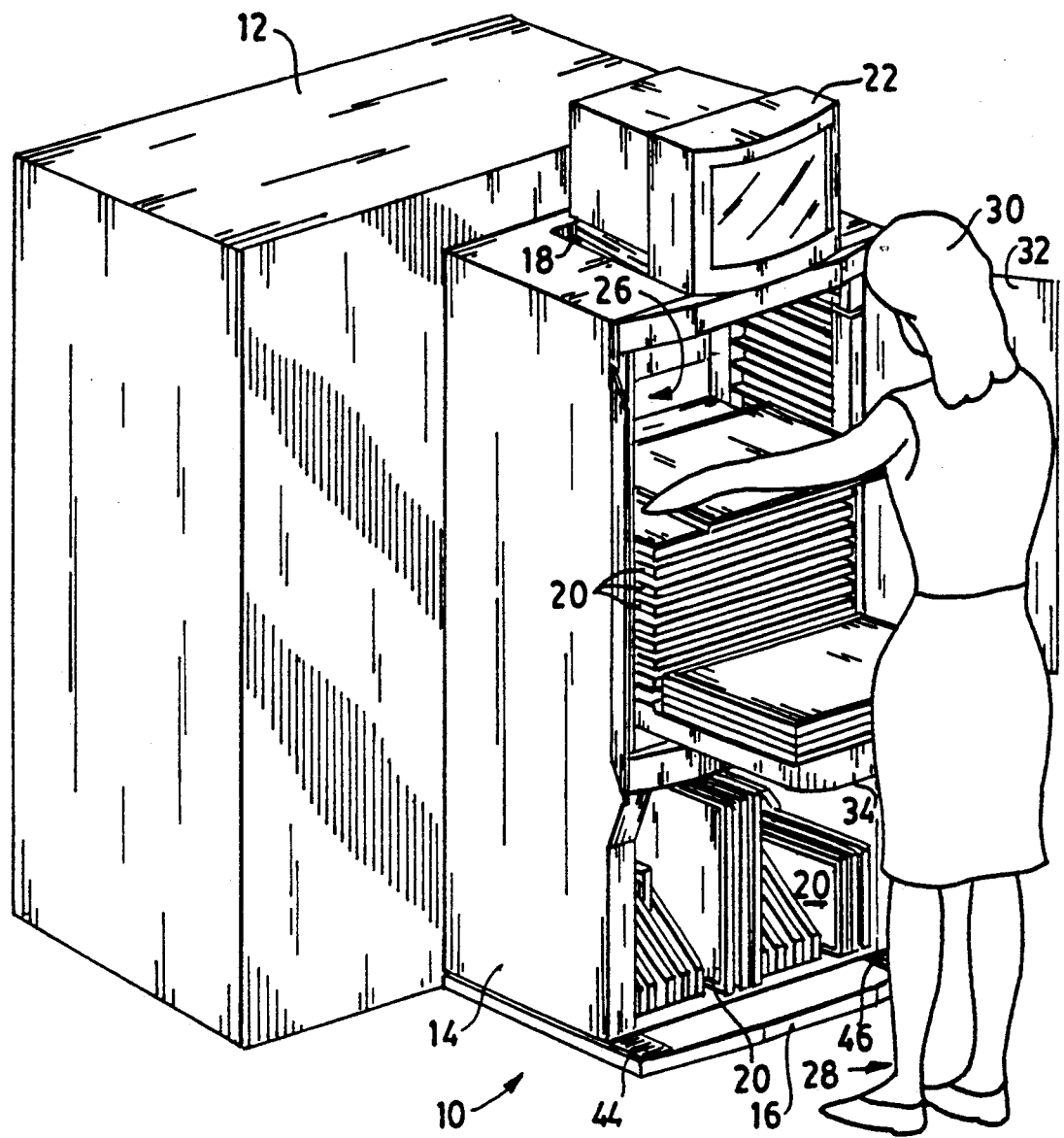
FIG. 1 is a front perspective view of a preferred embodiment of the x-ray cassette positioner of the invention along with an x-ray reader and a monitor.
Figure 2:
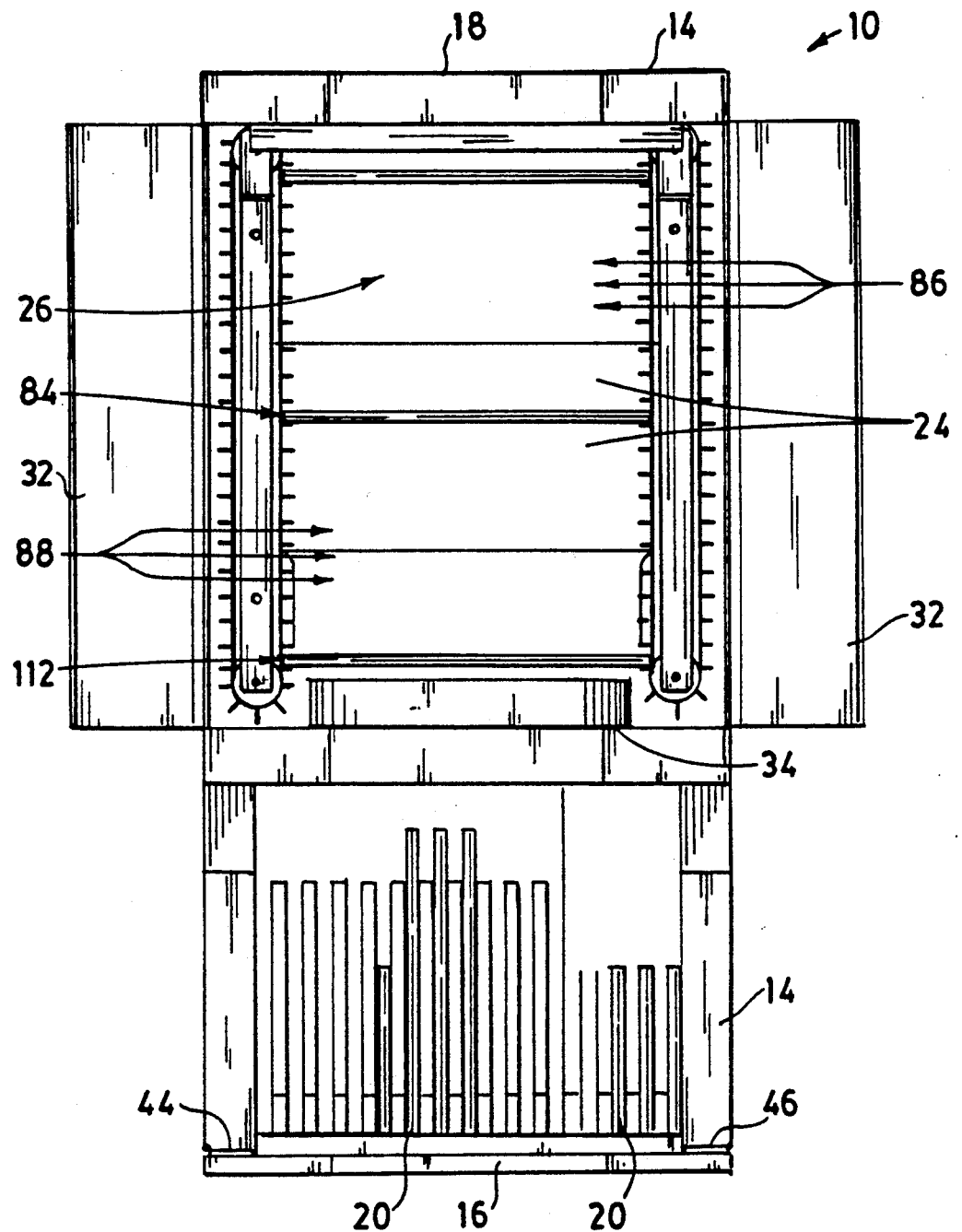
FIG. 2 is a front plan view of the x-ray cassette positioner of FIG. 1.
Figure 3:
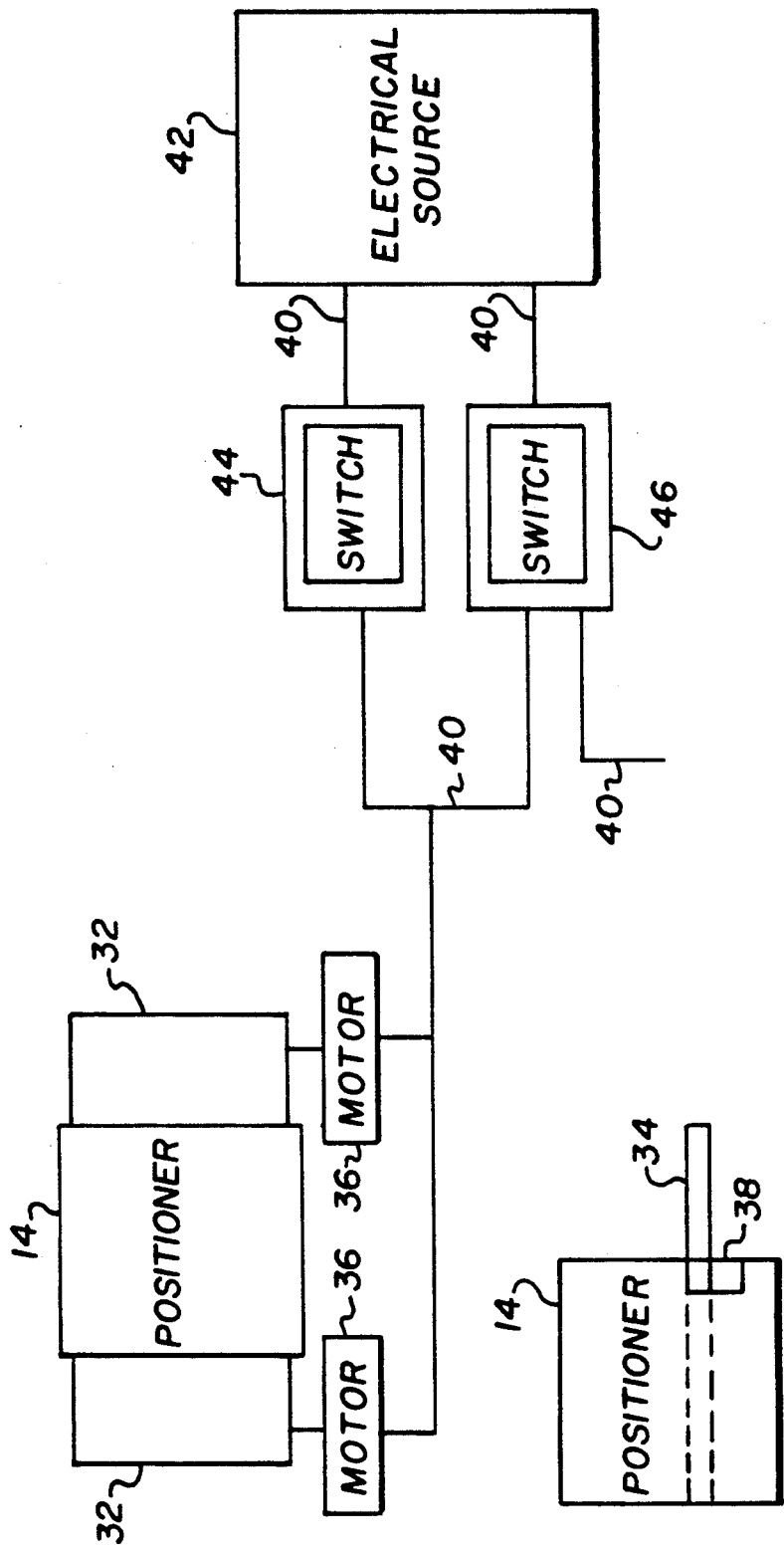
FIG. 3 is a schematic diagram of the door and table mechanisms of the x-ray cassette positioner of FIG. 1.
Figure 6:
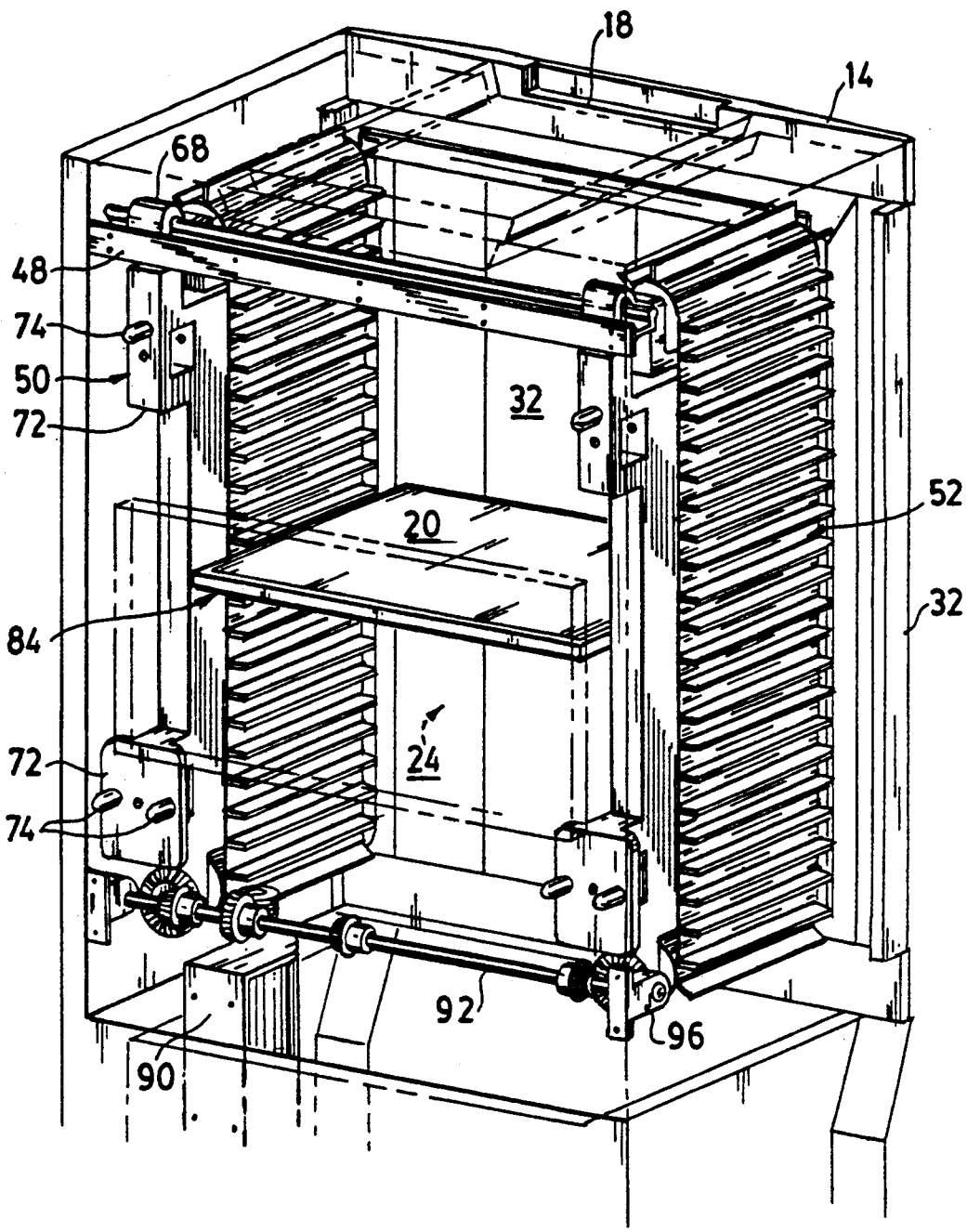
FIG. 6 is a rear perspective view of the conveyor system of FIGS. 4 and 5. The first conveyor assembly is shown in a first position. Body is shown in outline.
Figure 7:
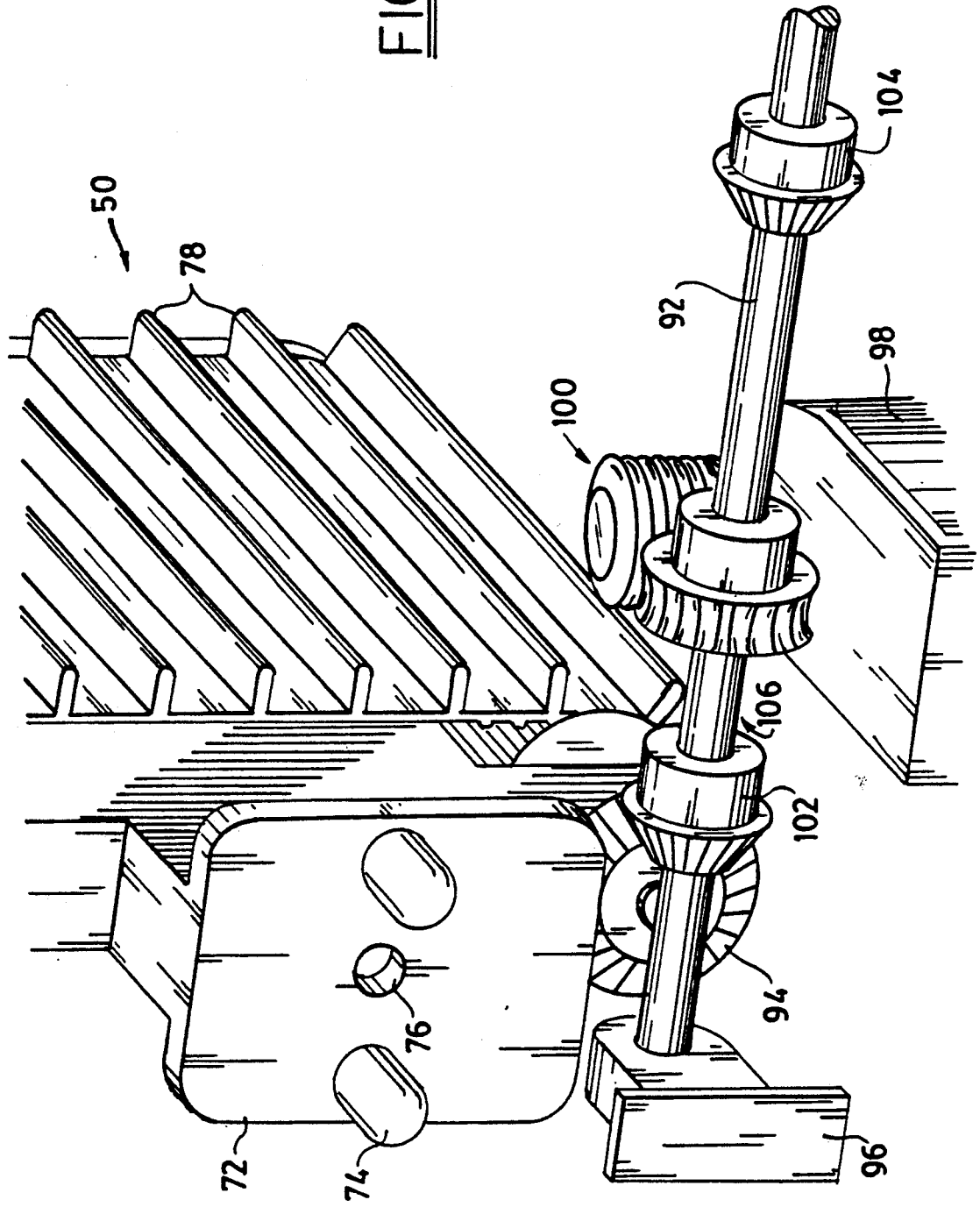
FIG. 7 is an enlarged rear perspective view of the conveyor assembly of FIGS. 4 and 5. The first conveyor assembly is shown in a first position.

Referring to FIGS. 1, 2 and 3, the x-ray cassette positioner 10 of the invention is illustrated in a position directly in front of an x-ray reader 12. X-ray cassette positioner 10 has a body 14 with a base 16 at the bottom and a monitor station 18 on top. Body 14 can be made of sheet metal or the like reinforced as necessary to support loads imposed by positioner components and x-ray cassettes 20. Monitor station 18 may include some means for preventing inadvertent movement of the monitor 22, such as an indentation. At the rear, body 14 has an access opening 24, through which can be extended an extractor or similar fixture (not shown) of x-ray reader 12. At the front, body 14 has a portal 26, which is roughly rectangular in shape and provides access to the interior of body 14. Facing portal 26 is an operator station 28, occupied by the operator 30 in FIG. 1. Doors 32 of body 14 are movable between an open position, shown in FIG. 1, in which the interior of body 14 is accessible and a closed position, shown from the rear in FIG. 6, in which portal 26 is closed. X-ray cassette positioner 10 includes a cantilevered table 34, which can be moved between a use position, shown in FIG. 1 and in solid lines in FIG. 3 and a storage position, inside body 14, shown in dashed lines in FIG. 3.

Movement of doors 32 and table 34 can be provided by servomotors 36,38 or the like. Table 34 can be used to hold x-ray cassettes 20 during loading and unloading. Alternatively, x-ray cassettes 20 can be loaded or unloaded from a cart (not shown). Controls are provided to permit the operator 30 to either open the doors 32 and extend the table 34 or to only open the doors 32. FIG. 3 illustrates those controls in diagrammatical form. Conductors 40 from the "hot" side of an electrical source 42 are indicated by single lines. Neutral or return conductors are not shown. Electrical source 42 is connected to a first foot switch 44 which is connected to door servomotors 36. Electrical source 42 is also connected to second foot switch 46, which is connected to door servomotors 36 and to table servomotor 38. Table 34 can be returned to storage position and doors 32 can be closed manually or servomotors 36,38 can be operated in reverse. This function can be provided by an additional switch (not shown) or can be part of a general actuation control (not shown). A wide variety of alternative circuits to provide these functions, including circuits using microprocessors are well known to those skilled in the art.

Referring now particularly to FIGS. 4–7, body 14 includes a support bar 48, from which hang first and second conveyor assemblies 50, 52 respectively. Each conveyor assembly 50, 52 has a rack 54 and, mounted on the rack 54, a conveyor 56,58, respectively. First and second conveyors 56, 58 each have an upper cogwheel 60, a lower cogwheel 62 and an endless cogbelt 64, all respectively. In a particular embodiment of the invention, first and second conveyors 56,58, respectively, are interchangeable.

Support bar 48 is a rigid extrusion attached to the back of body 14 near the top by fasteners or the like. Support bar 48 has a protruding flange 66 which receives hook portions 68 of racks 54. Racks 54 are rigid members which have a sheave portion 70 at each end for respective cogwheels 60,62. At the rear, racks 54 each have a pair of attachment portions 72. Each attachment portion 72 includes one or more positioning pins 74 and a hole 76 for a bolt or other fastener. Racks 54 can be recessed between attachment portions 72 to inset racks 54 from access opening 24.

Cogbelts 64 extend over racks 54 between cogwheels 60,62. Extending outward on cogbelts 64 are regularly spaced shelves 78. Cogbelts 64 can be chains, in which case, cogwheels 60,62 are sprockets, however, it is desirable that cogbelts 64 be timing belts and cogwheels 60,62 be toothed timing belt pulleys. The timing belts are desirable made of a polymeric or reinforced polymeric material. Timing belts present the advantages over chains of generally smaller dimensions, reduced weight and ease in handling, particularly in reference to the repositioning of first conveyor assembly 50, which is discussed below in detail.

Conveyor assemblies 50,52 are each oriented with their longest dimensions vertical. Cogbelts 64 are separated for almost their entire lengths by a distance slightly larger than one of the dimensions of a standard size x-ray cassette. Cogbelts 64 have utilization segments 80 that face each other and return segments 82 that face to the outside. Shelves 78 of utilization segments 80 of cogbelts 64 define a sequence of vertically arranged cassette sites 84,86,88 within body 14. In line with the center of access opening 24 is a read site 84 (reader acess site). A cassette 20 within read site 84 can be accessed by a reader 12. For example, a pair of vertically separated jaws (not shown) could extend from reader 12 and grip cassette 20 allowing an extractor (not shown) to engage and remove a photographic element (not shown). Above read site 84 are a number of loading sites 86, preferably ten or more, into which cassettes 20 may be slid by the operator 30. Cassettes 20 can be interchanged between loading sites 86 easily as needs change, since each cassette 20 is individually supported by a pair of vertically aligned shelves 78 and cassettes 20 are spaced apart from each other by a distance sufficient to permit each individual cassette 20 to be gripped while positioned fully to the back of a respective cassette site 84,86,88. Below read site 84 are a series of unloading sites 88, preferably ten or more, from which cassettes 20 may be unloaded at the convenience of the operator 30 or as needs warrant.

Both conveyors 56,58 are driven in unison by a positive drive 90. Positive drive 90 moves cogbelts 64 by increments equal to the vertical thickness of a cassette site 84,86,88. A variety of components can be used to provide this movement with a high degree of precision. One example is a geneva mechanism (not shown). In the geneva mechanism, a gear reduction motor would provide an approximate one revolution input to a geneva, which would provide an output of precisely one quarter revolution. That output could be coupled through a gear and timing belt to each conveyor to provide one eighth revolution, which could move cassettes 20 precisely from one cassette site to the next lower site.

In a more preferred embodiment of the invention, illustrated in the Figures, positive drive 90 has a geared driveshaft 92 and a pair of primary gears 94. (Gears are illustrated in simplified form in the Figures, however, actual gears of conventional design are intended. Other than such obvious simplifications, schematic views in the Figures are drawn to scale.) Driveshaft 92 is supported at each end by bearing blocks 96. The Figures show primary gears 94 each fixed to the rear end of a lower cogwheel 62 of a respective conveyor 56,58. Primary gears 94 can be positioned in alternate ways, for example, primary gears 94 can be fixed to respective upper cogwheels 60. Primary gears 94 can be made removable for repairs.

Driveshaft 92 is connected to a stepper motor 98 or the like by a gearset 100. Stepper motors and controllers appropriate for this embodiment of the invention are well known to those skilled in the art. Alternative systems such as motors with controllers using sensors tied to movement of cogwheels 60,62 or cogbelts 64 could also be used. Additional controls for safety and convenience can also be added, for example, means for disabling motor 98 when doors 32 are opened. Driveshaft 92 has two driveshaft gears 102 and a secondary gear 104. Driveshaft gears 102 rotate primary gears 94 of first and second conveyors 56,58, respectively, in opposite directions in order to make utilization segments 80 of cogbelts 64 travel together in the same direction. It is convenient to use a driveshaft 92 in which driveshaft gears 102 are mirror images of each other. Secondary gear 104 is between driveshaft gears 102 and has the same configuration as one of driveshaft gears 102. First conveyor 56 is movable from a first position 106 in which a respective primary gear 94 is meshed with a driveshaft gear 102 to a second position 108 in which primary gear 94 is meshed with secondary gear 104. First conveyor 56 is moved by first fixing cogbelt 64 relative to rack 54. This may be accomplished by any convenient means, for example, by placing a wood strip between an adjoining pair of shelves 78 and securing the wood strip in place with a C-clamp. First conveyor 56 may then be unbolted, moved to the other position, lowered into place, and rebolted. Cogbelt 64 may then be released. Body 14 does not require special provisions to accommodate movement of first conveyor 56, with the exception that table 34 can include a recessed section 10 to accommodate conveyor assembly 50 in second position 108.

Motor 98 is actuated by reader 12 based upon the readiness of reader 12 for cassette 20 or photographic element. Reader 12 sends a signal to a controller (not shown), which actuates conveyors 56,58. Provision of the signal may take a variety of means known to those skilled in the art, for example, reader 12 may direct a light beam at a photodetector wired to stepper motor controller. When actuated, motor 98 drives conveyors 56,58 an increment at a time to shift loaded cassettes 20 downward in steps equal to the separation between cassette sites 84,86,88. Reader 12 accesses each cassette 20 as cassette 20 is presented in read site 84. When a cassette 20 reaches the lowermost unloading site 112, a switch (not shown) is actuated by the cassette 20, stopping further movement of conveyors 56,58. The switch can be, for example, a mechanical pressure switch or an optical switch actuated by the interruption of a beam.

Figure 4:
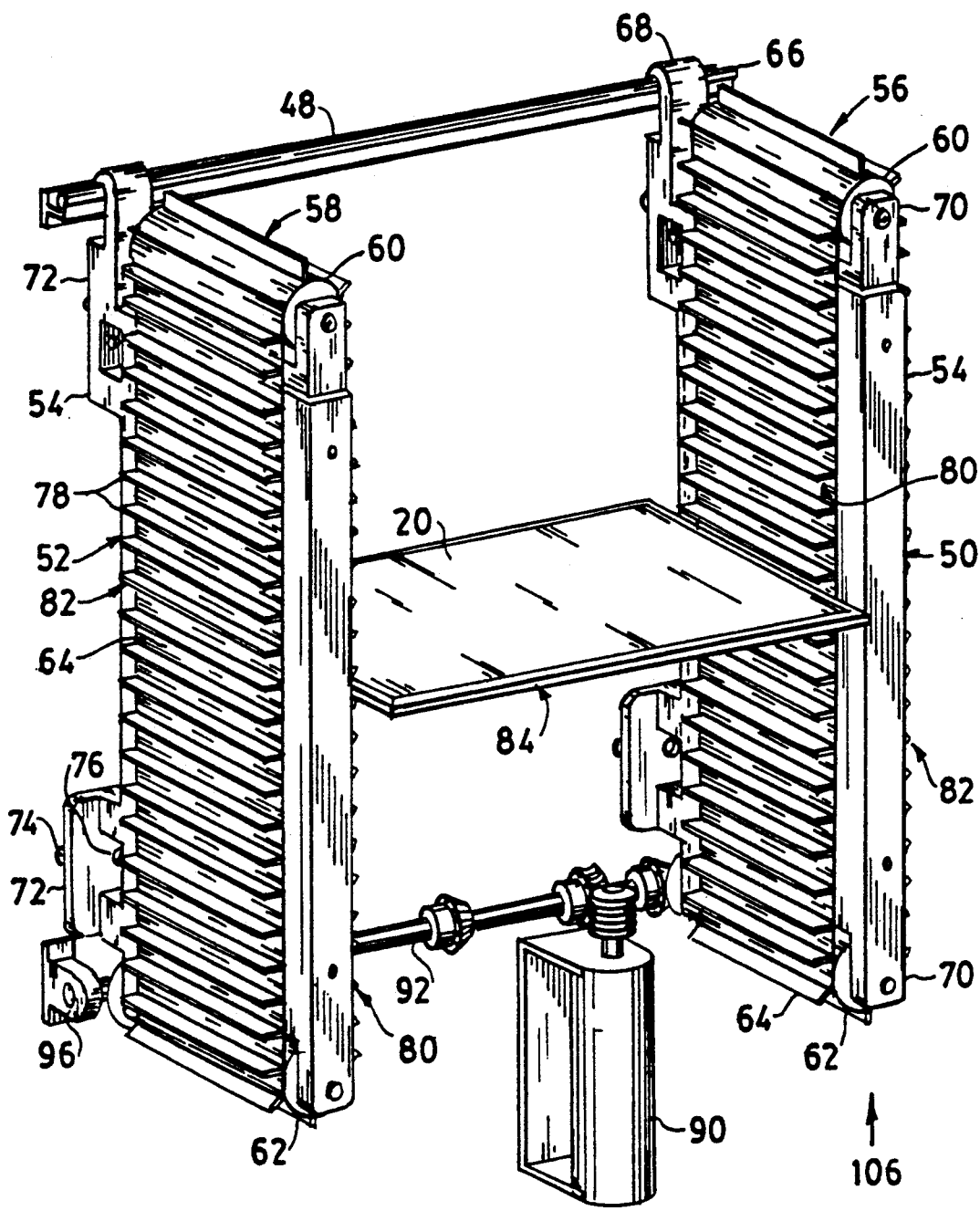
FIG. 4 is a front perspective view of the conveyor system of the x-ray cassette positioner of FIG. 1. A first conveyor assembly is shown in a first position.
Figure 8:
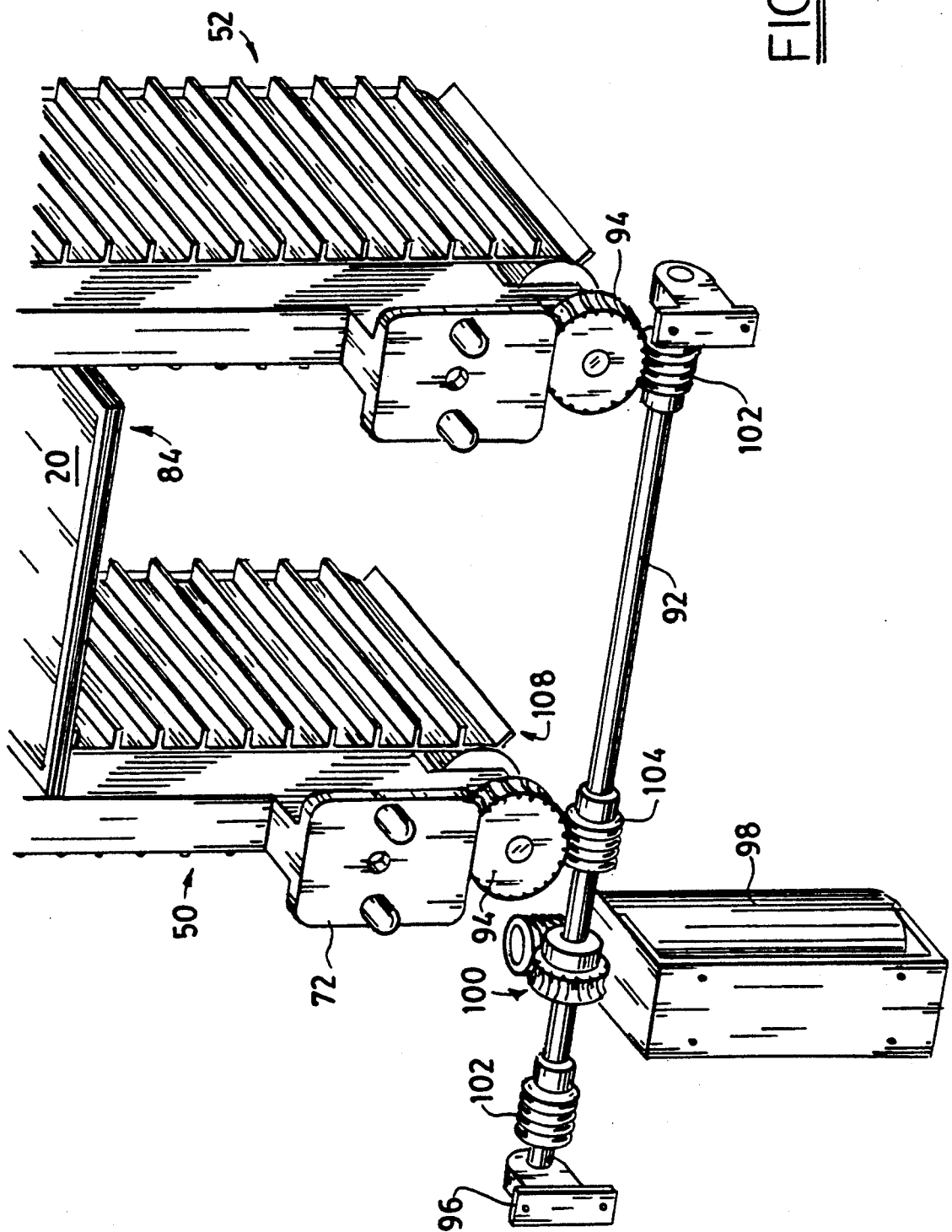
FIG. 8 is an enlarged rear perspective view of an alternative embodiment of the conveyor assembly.
Figure 9:
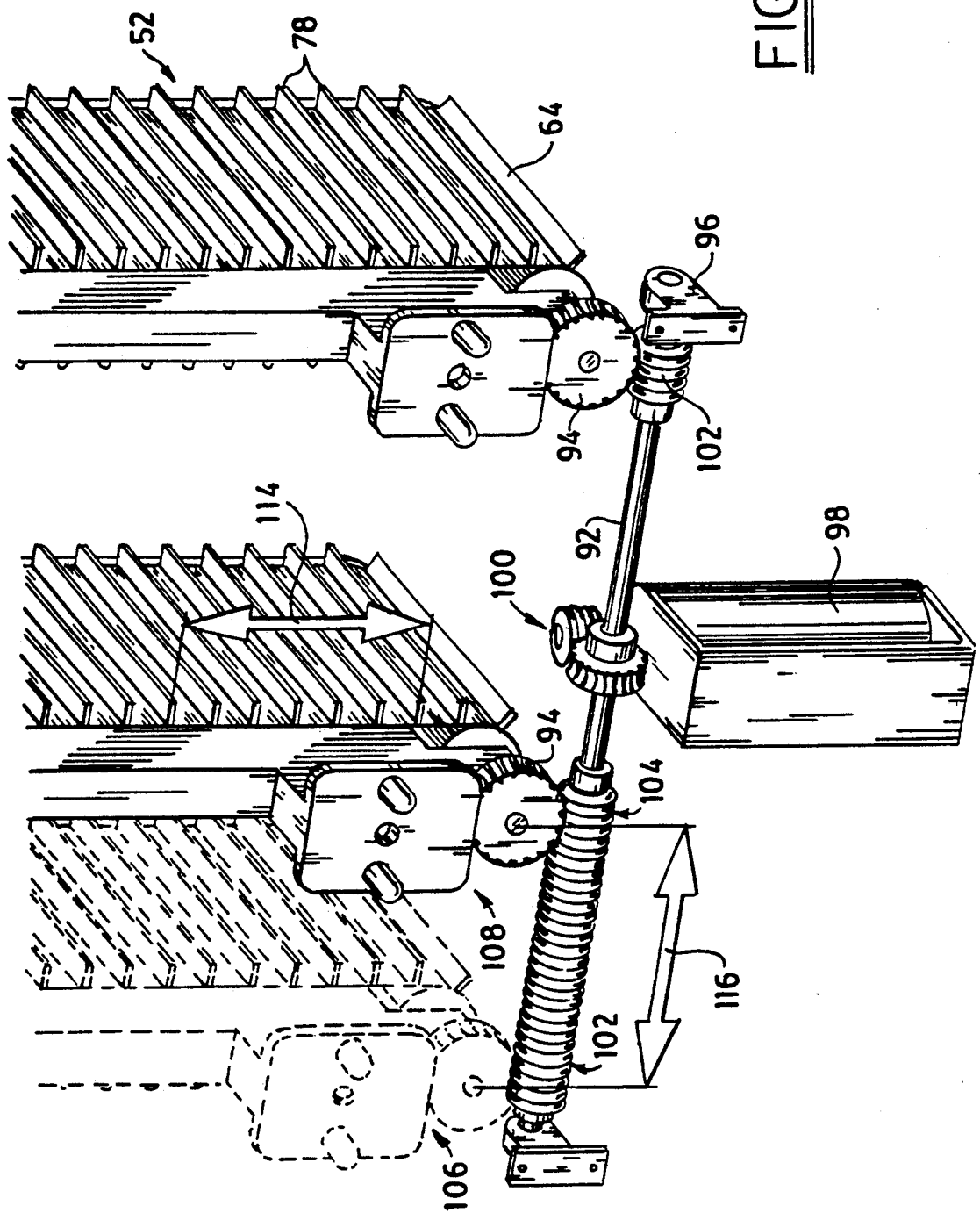
FIG. 9 is a semi-diagrammatical rear perspective view of another alternative embodiment of the conveyor assembly. The first conveyor assembly is shown twice to illustrate movement of the first conveyor assembly from first to second positions.

In the embodiment of the invention shown in FIGS. 4-7, gears 94,102,104 are bevel gears. FIG. 4 illustrates first conveyor 56 in a first position 106, with a standard size large cassette (for example, 14 inches by 17 inches) registered in read site 84. Smaller cassettes could be used with first conveyor 56 in this first position 106 by using the smaller cassettes with adaptors or pallets (not shown) sized to match a larger size cassette. First conveyor 56 can alternatively be moved to a second position 108, shown in FIG. 5. A standard size smaller cassette (for example 8 inches by 10 inches) is shown in read site 84. Other size cassettes sharing one dimension (for example 10 inches by 10 inches (not shown)) could also be accommodated at the same time. In the embodiments of the invention of FIGS. 8 and 9, primary gears 94 are worm gears and shaft gears and secondary gear 104 are worms. Worms and worm gears have the advantage of providing a braking action in the event of a power failure while positioner 10 is loaded with cassettes 20. In the embodiment of the invention of FIG. 9, one of driveshaft gears 102 and secondary gear 104 are different sections of a continuous worm. The pitch of that worm and worm gear must be selected to move cogbelt 64 a distance equal to an integer number of cassette sites 84,86,88, indicated by arrow 114, when first conveyor 56 is moved between first and second positions 106,108, indicated by arrow 116.

In an example of a particular embodiment of the invention, cogbelt 64 is a timing belt of polyurethane having the dimensions: 150 centimeters long, 9.5 inches wide, 1 tooth/centimeter. Shelves 78 extend outward 1.5 centimeters and are uniformly spaced apart by a separation of 3 centimeters. In that embodiment there are 10 loading sites 86, and 10 unloading sites 88. There is cassette storage within body 14 below portal 26 and monitor station 18 is less than five feet above base 16 of body 14.

In use, the operator 30 brings one or more x-ray cassettes 20 to positioner 10 by hand or on a cart. Operator 30 then opens the doors 32 and, at the operator's option extends table 34 by actuating one of foot switches 44,46. Operator 30 lifts x-ray cassettes 20 with both hands and places them in loading sites 86. The order in which loading sites 86 are loaded is at the option of the operator 30. Table 34 is moved to storage position, doors 32 are closed and positioner 10 is prepared to operate. Positioner 10 does not move conveyors 56,58 until a signal is received from reader 12, which causes cassettes 20 to each step downward to the next lower cassette site 84,86,88. When a cassette 20 has been positioned in read site 84, reader 12 acts on that cassette 20, by extracting the photographic element or cassette 20 and processing the element or cassette 20. The cassette 20 or element is then returned and positioner 10 is again signaled to move cassettes 20 downward by an increment. This continues until operator 30 again opens doors 32 and loads or unloads cassettes 20 or until a cassette 20 reaches the lowermost unloading site 112, at which time further movement of conveyors 56,58 is halted.

Figure 5:
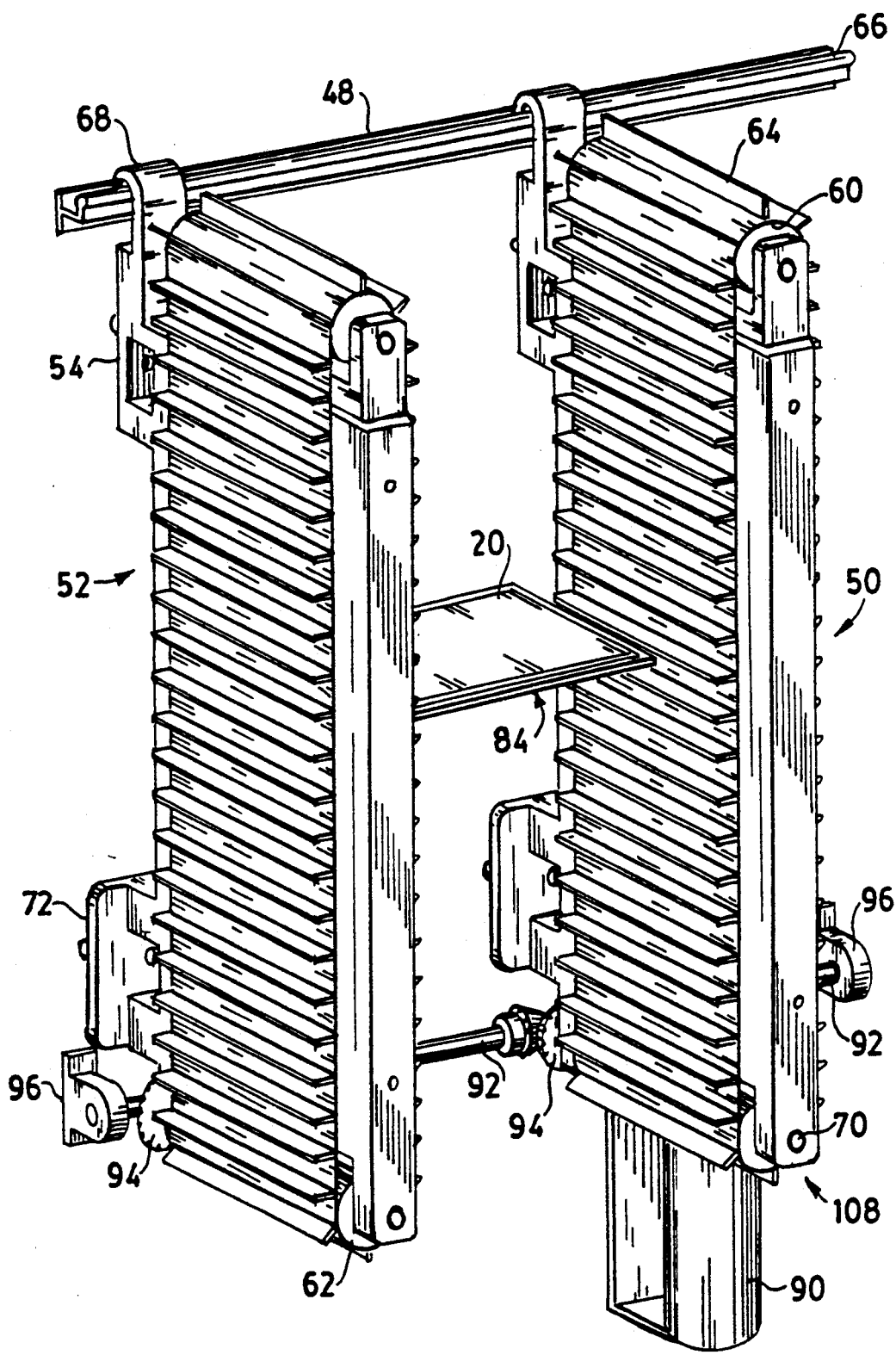
FIG. 5 is the same view as FIG. 4, except the first conveyor assembly is shown in a second position.
Figure 10:
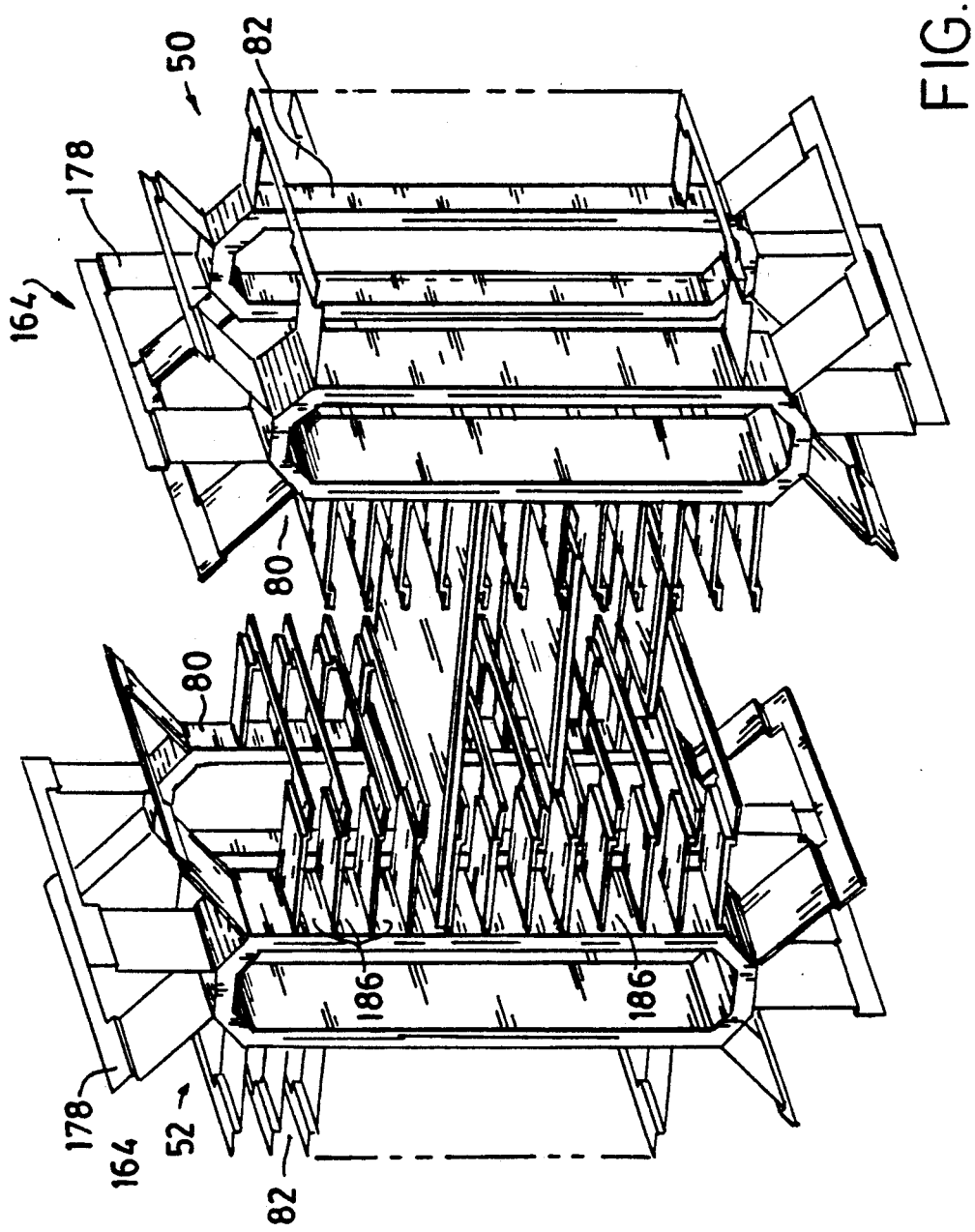
FIG. 10 is a front perspective view of a pair of modified cogbelt designed for use on the conveyor assemblies of FIGS. 4 and 5 illustrating a plurality of different size cassettes placed thereon.
Figure 11:
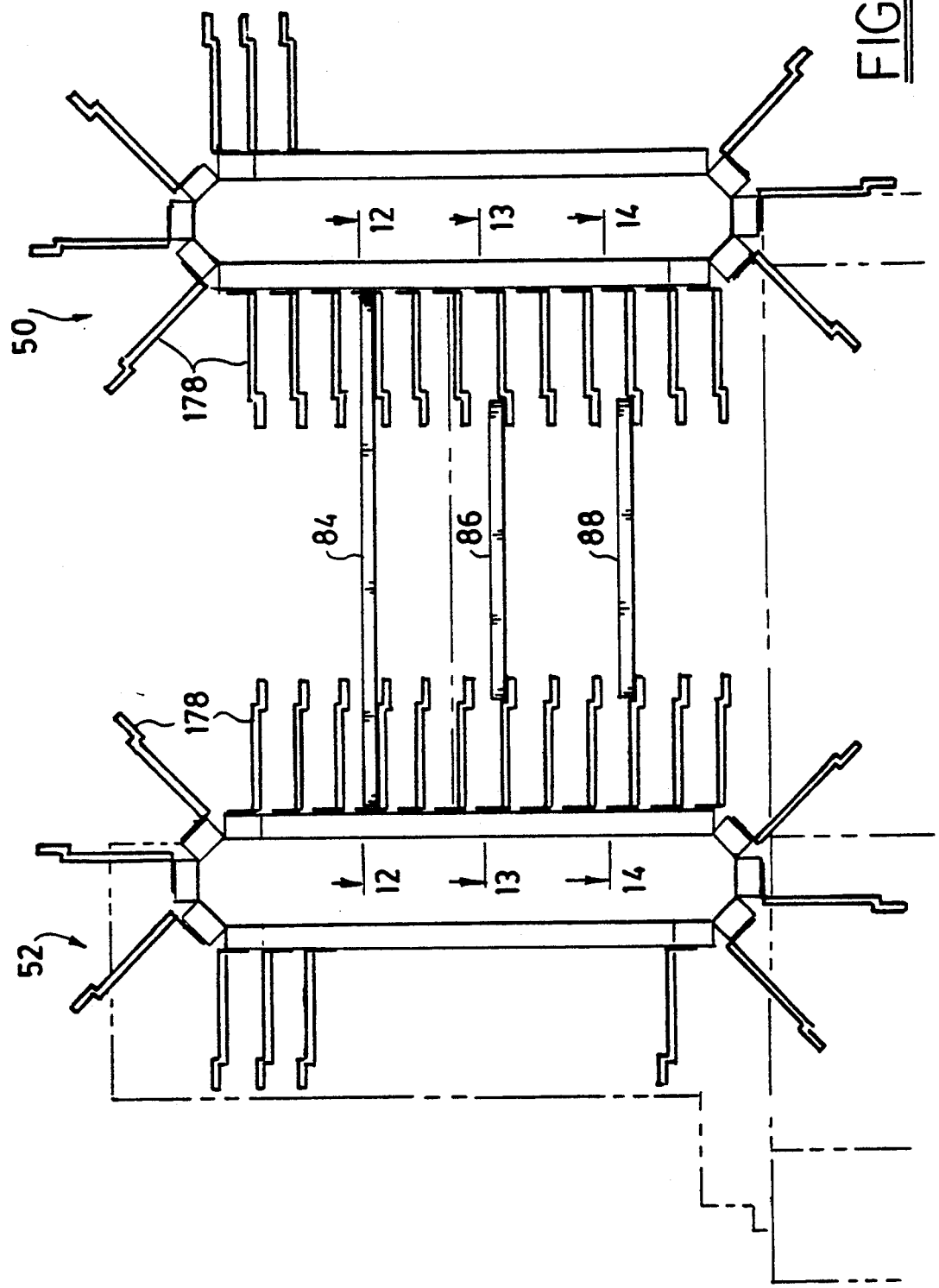
FIG. 11 is a front elevational view of FIG. 10.

Referring to FIGS. 10 and 11, there is illustrated a pair of modified cogbelts 164 designed for use on the conveyor assemblies 50,52, previously described with respect to FIGS. 4 and 5. Cogbelts 164 are similar to cogbelts 64, like numerals indicating like parts. Thus, cogbelts 164 each have utilization segments 80 that face each other and return segments 82 that face to the outside. Utilization segment 80 of cogbelts 164 each have a plurality of shelves 178 which define a sequence of vertically arranged cassettes sites 84,86,88. As previously described with respect to FIGS. 4 and 5, cassettes 20 can be interchanged between loading sites easily as needs change since each cassette 20 is individually supported by a pair of associated vertically aligned shelves 178. In this embodiment the shelves 178 are similar to shelves 78 except shelves 178 have means for receiving and positioning more than one size cassette within the cassette sites.

Figure 12:
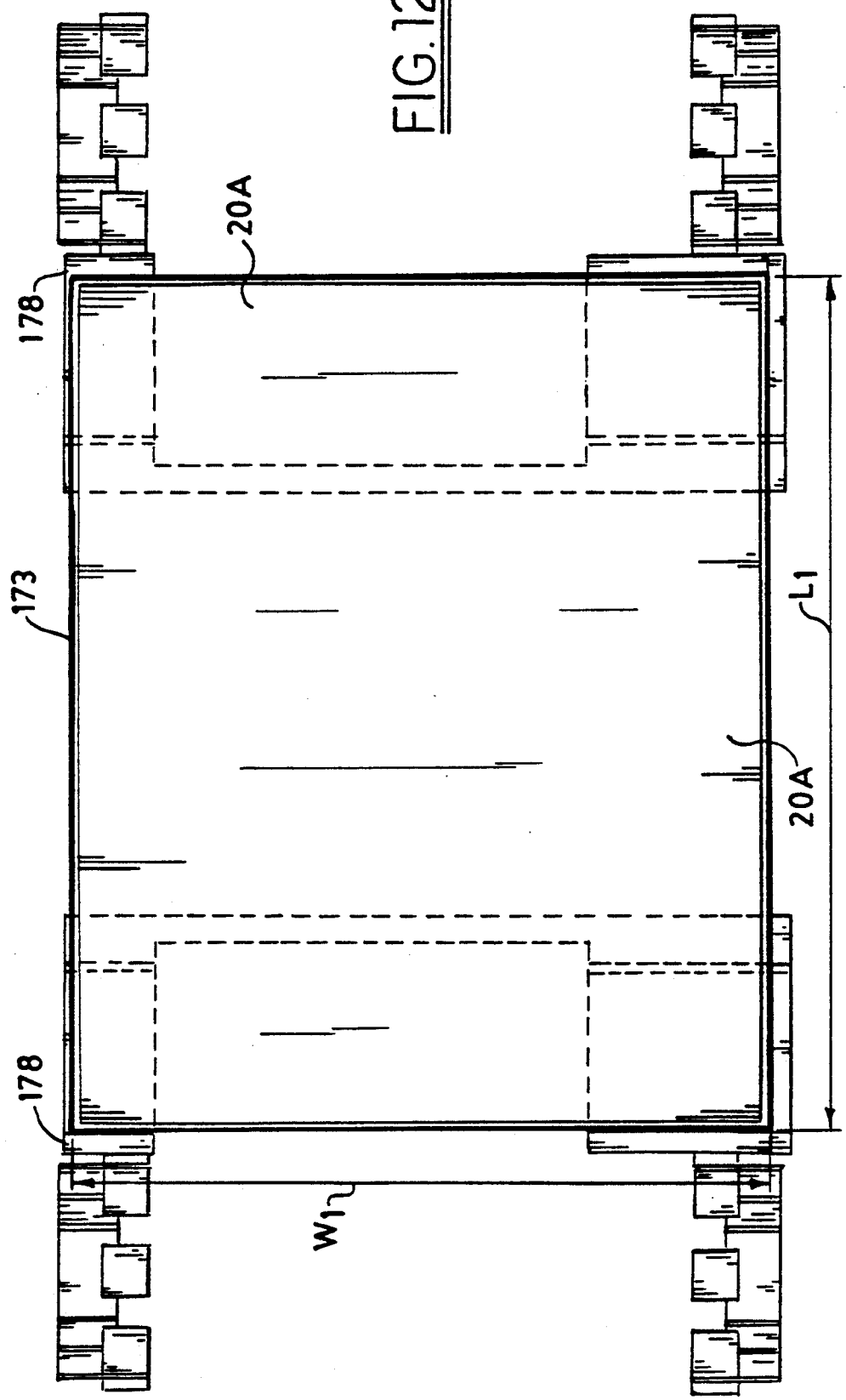
FIG. 12 the top plan view of a full size cassette placed in one of the cassettes sites of the cogbelts of FIG. 11 as taken along line 12—12.

FIG. 12 illustrates a full size cassette 20A having a length L1 and a width W1 supported by a pair of associated vertically aligned shelves 178. In the particular embodiment illustrated, the conveyor assemblies 50,52 have been spaced apart so as to accommodate a full size cassette 20A having a length L1 of about 14 inches (35.56 cms) and a width W1 of about 11 inches (27.94 cms). However, it is to be understood that conveyor assemblies 50,52 may be spaced apart an appropriate distance so as to accommodate any desire maximum size cassette.

Figure 13:
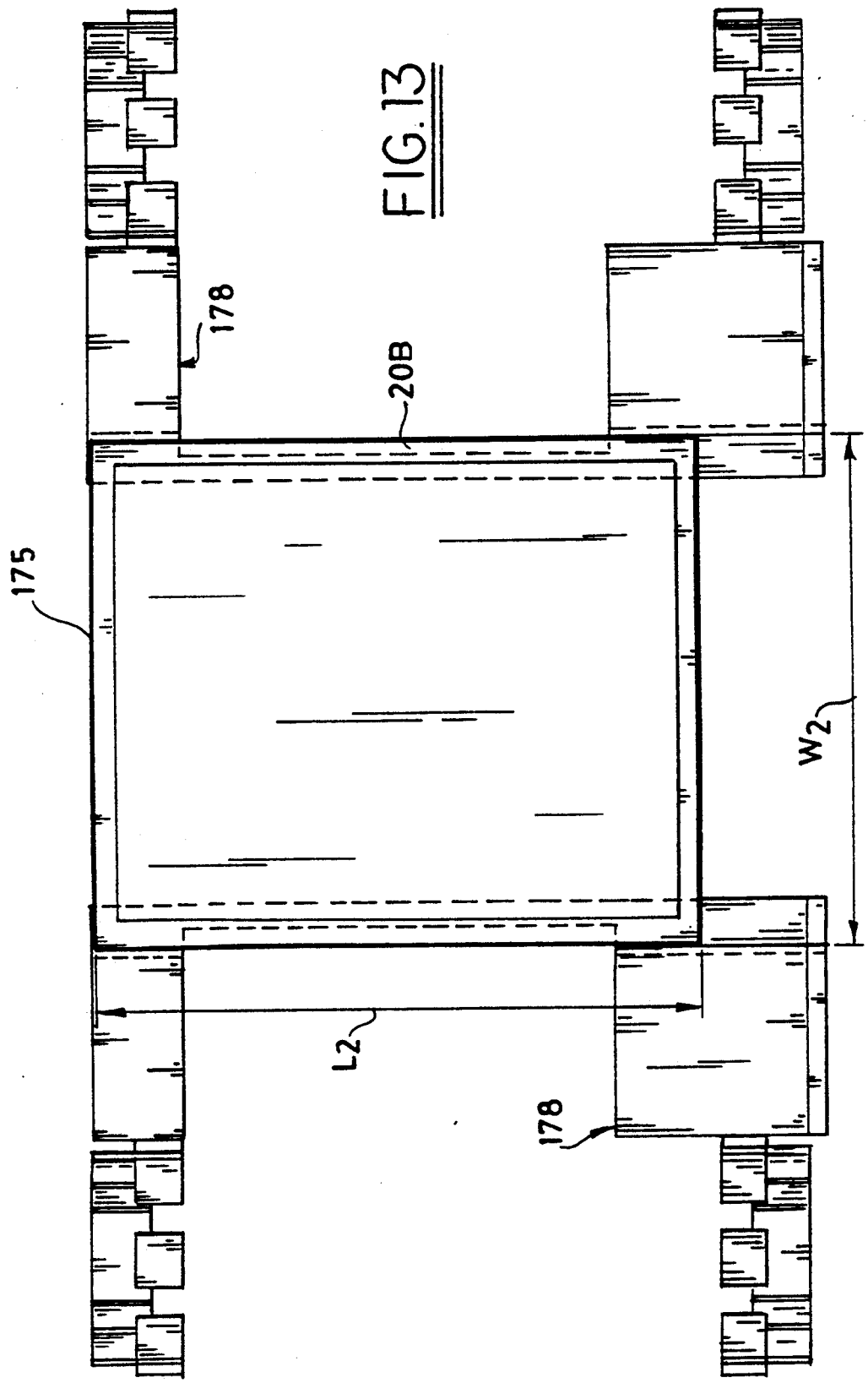
FIG. 13 is a top plan of a cassette of a second size placed in a second cassettes site of the cogbelts of FIG. 11 as taken along line 13—13.
Figure 14:
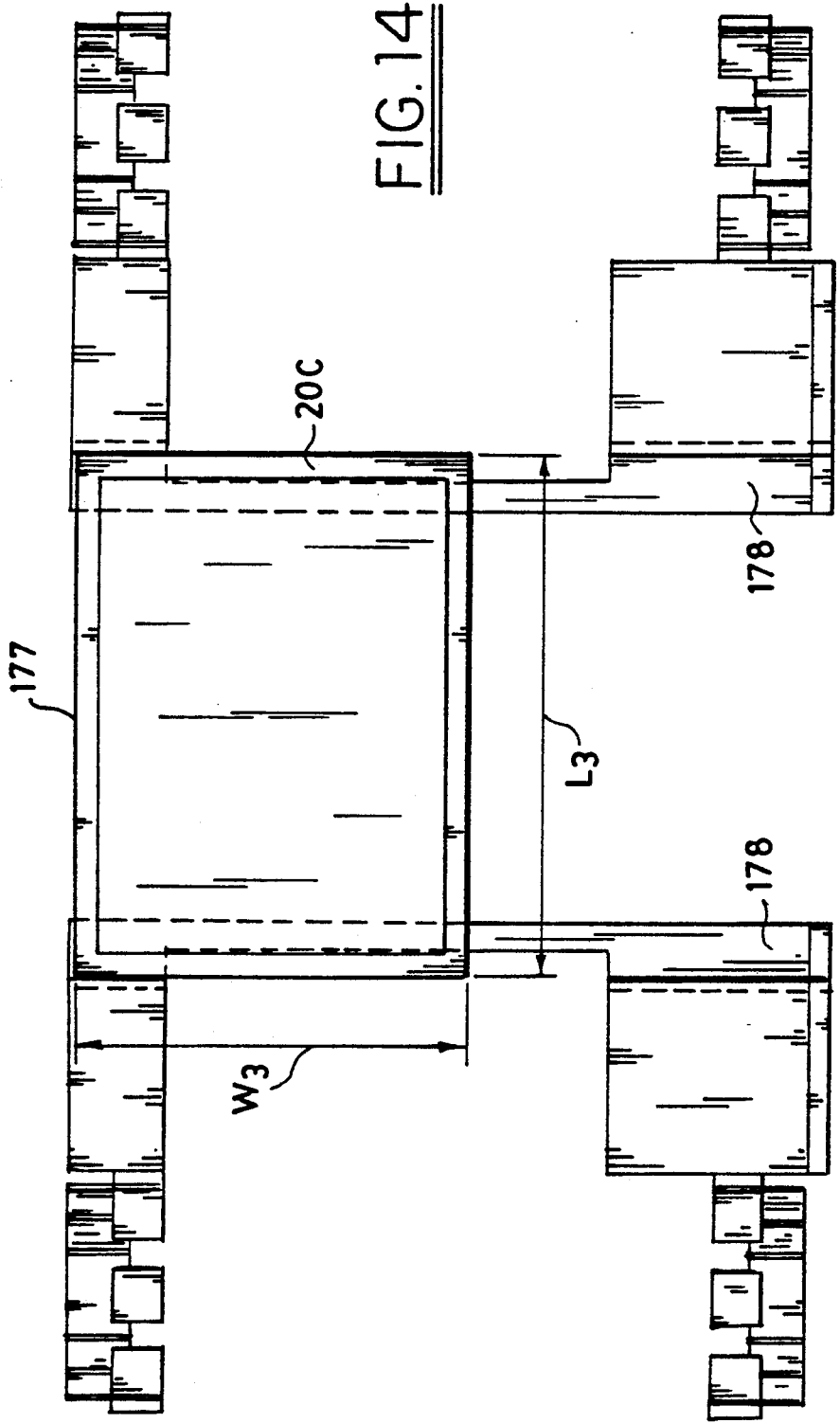
FIG. 14 is a top plan of a cassette of a third size placed in a third cassette site of the cogbelts of FIG. 11 as taken along line 14—14.

As previously discussed, the shelves 178 are provided with means for holding and positioning cassettes of more than one size in the cassette load sites. Referring to FIGS. 13 and 14, the shelves 178 have a configuration designed to receive and hold securely in place a cassette 20B or cassette 20C, each having a size which is smaller than the full size cassette 20A illustrated in FIG. 12. Cassette 20B has a width W2 and a length L2, and cassette 20C has a width W3 and a length L3. In the particular embodiments illustrated, L2 is approximately 12 inches (30.48 cms), the width W2 is approximately 10 inches (24.54 cms), L3 is approximately 10 inches (25.4 cms) and width W3 is approximately 8 inches (20.32 cms). In cassette 20B, the photographic element provided therein is designed to be removed from one of the short sides, for example, side 175. Whereas in the cassette 20A of FIG. 12, the photographic element is designed to be removed from one of the long sides of the cassette, for example, side 173. The photographic element of cassette 20C, as shown in FIG. 14, is designed to be removed from one of the long sides, for example, side 177, in a manner similar to cassette 20A.

Figure 15:
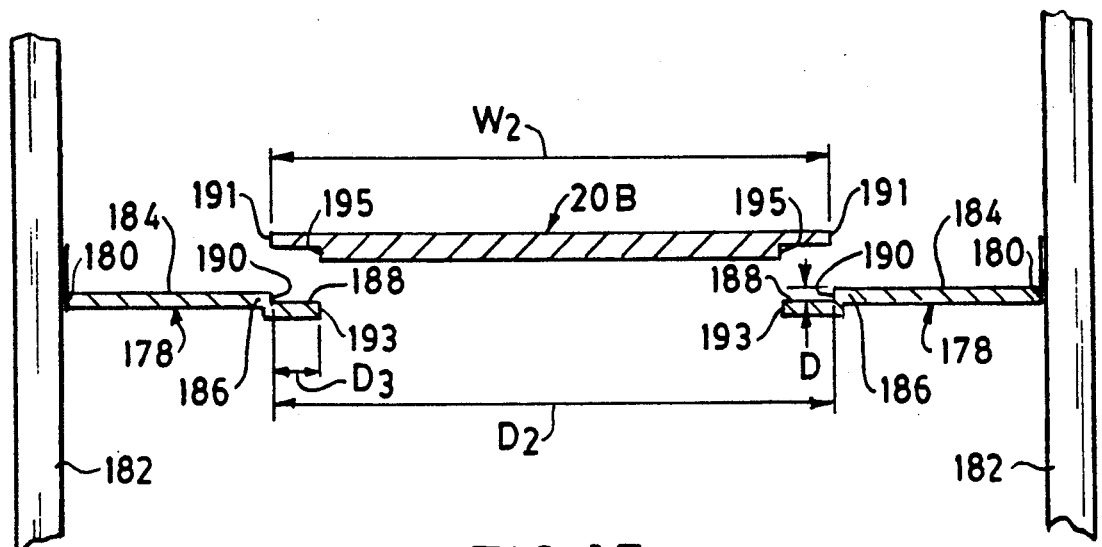
FIG. 15 is an enlarged exploded view of a portion of the cogbelt of FIG. 11 illustrating the relationship of the cassette of FIG. 13 with respect to its associated shelves.
Figure 16:
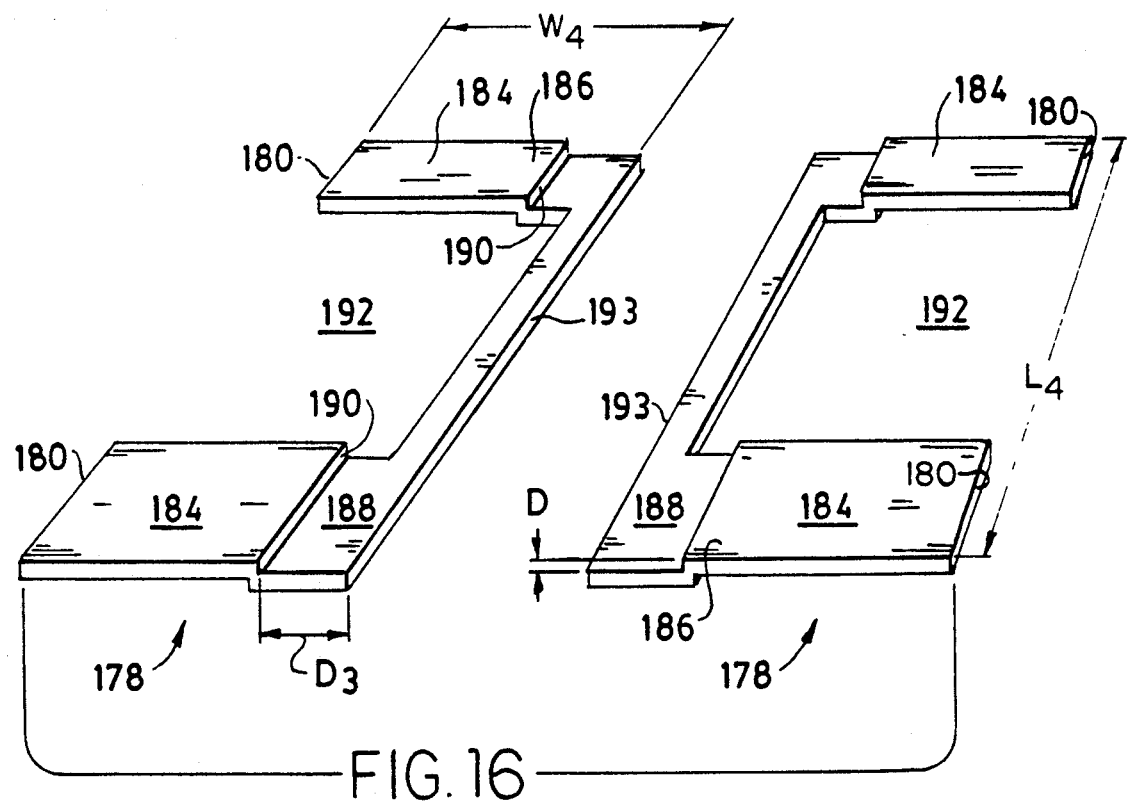
FIG. 16 is a perspective view of a pair of associated vertically aligned shelves illustrated in FIGS. 15.

Referring to FIGS. 15 and 16, there is illustrated in greater detail the configuration of shelves 178 and the relationship of cassette 20B with respect to a pair of associated aligned shelves 178. For the sake of clarity only, a single pair of associated aligned shelves 178 will be described in detail, it being understood that the remaining shelves 178 are identical in construction. Referring to FIG. 16, the shelves 178 each have an inner end 180 secured to the web portion 182 of its respective endless cogbelt 164. A first upper support surface 184 is provided on each shelf 178 which extends from the inner end 180 in a direction away from the web portion 182 terminating in an outer end 186. The upper support surfaces 184 of shelves 178 are designed to support a full size cassette 20A as is illustrated in FIGS. 11 and 12. In the particular embodiment illustrated, the upper support surface 184 of each shelf 178 has a width W4 and a length L4. The particular size of width W4 and length L4 is selected so that cassette 20A may be properly supported. Each shelf 178 is further provided with a lower support surface 188 which extends from the outer end 186 of upper support surface 184. The lower support surface is disposed a distance D below upper support surface 184 and forms a registration surface 190 against which one of the sides 191 of the cassette 20B is designed to mate. The registration surface 190 of associated shelves 178 are disposed a distance D2 apart. In the particular embodiment illustrated, the distance D2 is substantially equal to or slightly greater than the length L3 of cassette 20C and the width W2 of cassette 20B. Therefore, a single registration surface 190 on each shelf 178 can be used to locate securely in position at least two different size cassettes.

Preferably, as illustrated, the shelf 178 is provided with a recess section 192 to allow the operator easily place or remove a cassette on the shelf 178. The recess section 192 may be shaped to any desired configuration so long as there is provided a sufficient amount of registration surface 190 for locating in position the cassette. The lower support surface 188 extends a distance D3 beneath the cassette a distance sufficient to support the cassette. In the particular embodiment, distance D3 extends a distance. In the particular embodiment illustrated, D3 is such that the terminal end mates with a corresponding registration surface 195 provided on the cassette. However, it is to be understood that the second registration surface 193 is not necessary or required.

Figure 17:
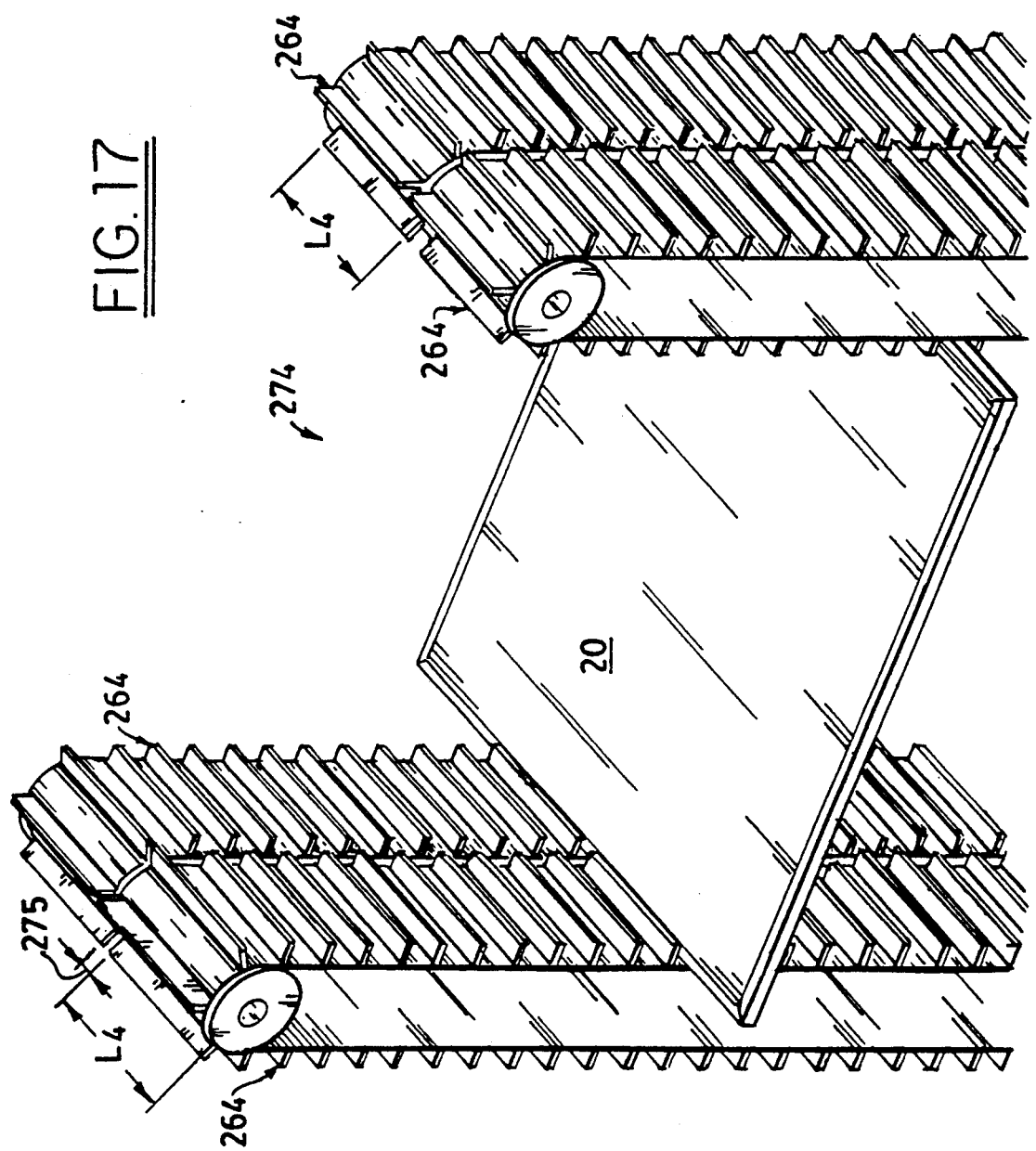
FIG. 17 is a partial front perspective view of the conveyor assemblies of FIGS. 4 and 5 illustrating yet another modified cogbelt configuration placed thereon.

Referring to FIG. 17, there is illustrated modified cogbelts 264 designed for use on the conveyor assemblies 50,52 of FIGS. 3 and 4. In this particular embodiment, each conveyor assembly 50,52 is provided with a pair of axially spaced cogbelts 264. Cogbelts 264 are similar to cogbelts 64, the only difference being that the length L4 of each of the cogbelt 264 is substantially less than that cogbelt 64 and a space 275 is provided between adjacent cogbelts 264 such that appropriate sensors may be placed on the rack 54 to allow monitoring and/or sensing of an appropriate cassette placed in each of the cassette sites. For example, to monitor whether a cassette is in a site and/or properly positioned therein.

Figure 18:
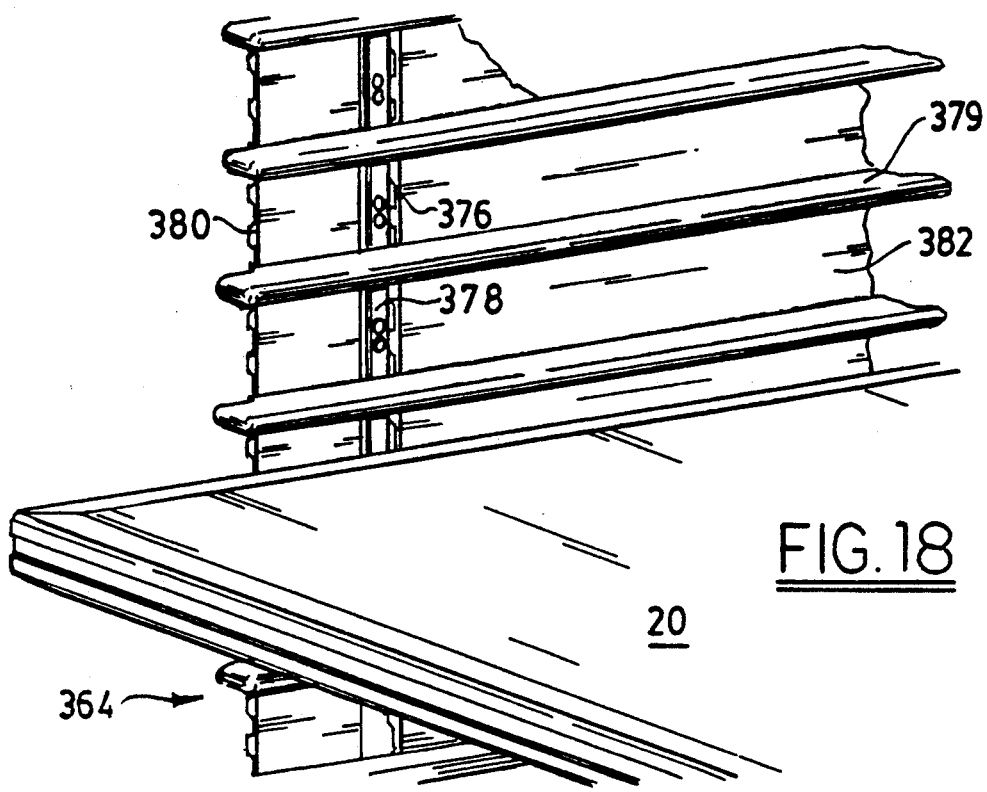
FIG. 18 is an enlarged partial front perspective view of yet another modified cogbelt made in accordance with the present invention illustrating a portion of a cassette located in one of the cassette sites.

Referring to FIG. 18, there is illustrated an enlarged partial front perspective view of a modified cogbelt 364 also made in accordance with present invention. Cogbelt 364 is similar to cogbelt 64. In this particular embodiment, a substantially continuous vertical extending opening 376 is provided in cogbelt 364 to allow the use of sensors 378 which are mounted to the rack on which the cogbelt is mounted. Sensors 378 may be used to obtain information for monitoring the cassettes as previously discussed. In this embodiment, shelves 379 extend beyond the lateral edge 380 of the belt 364 to allow the use of a smaller width web 382 in the main portion of cogbelt 364.

Figure 19:
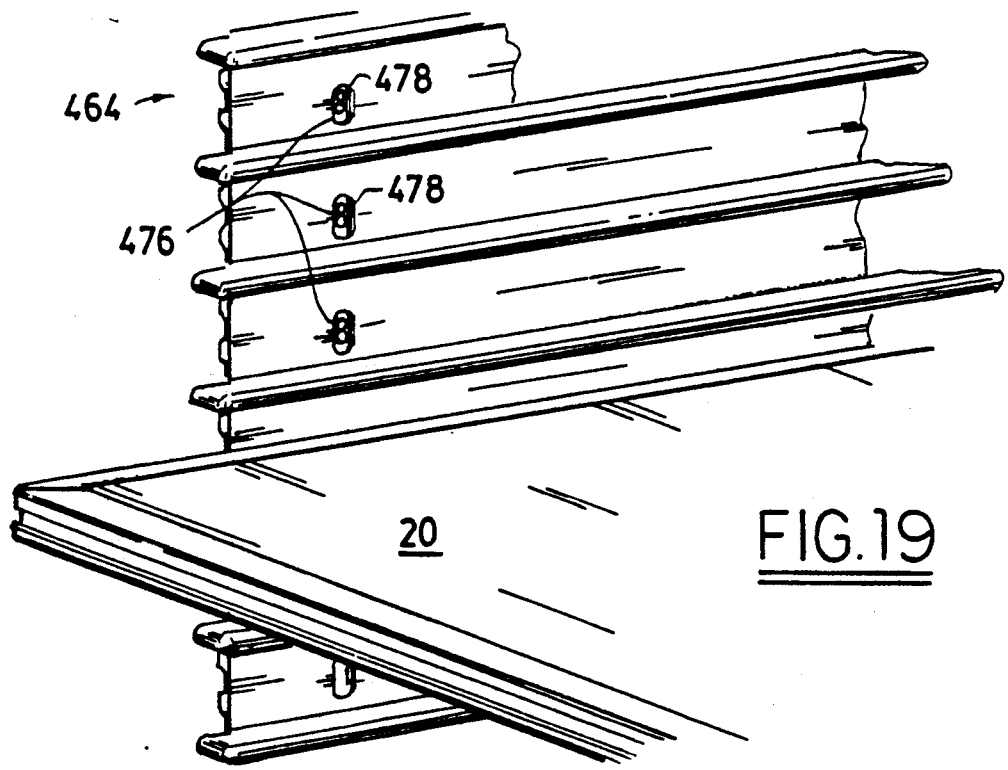
FIG. 19 is an enlarged partial front perspective view of still another modified cogbelt made in accordance with the present invention illustrating a portion of a cassette in one of the cassette sites.
Figure 20:
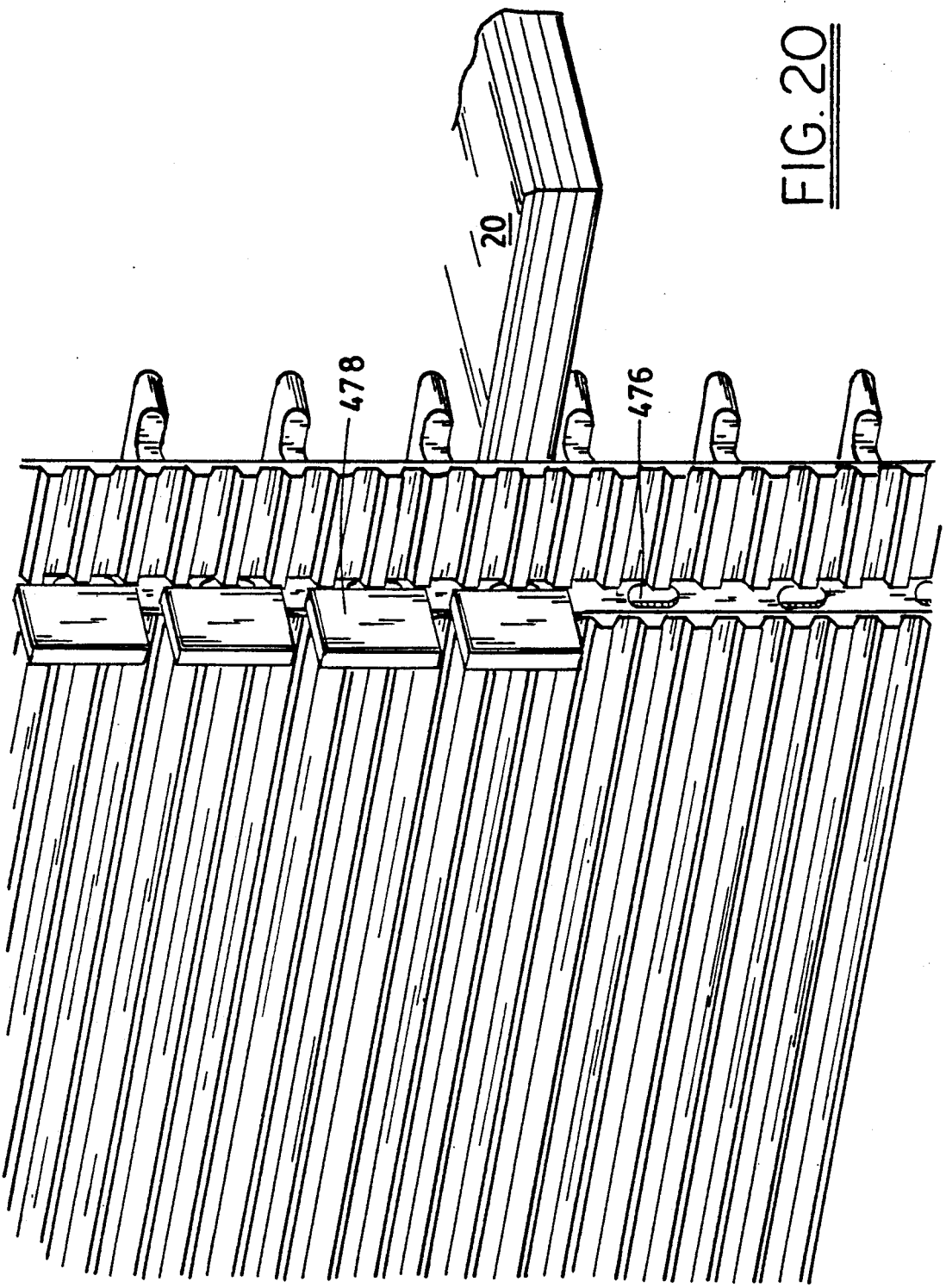
FIG. 20 is a rear perspective view of the cogbelt of FIG. 19.
Figure 21:
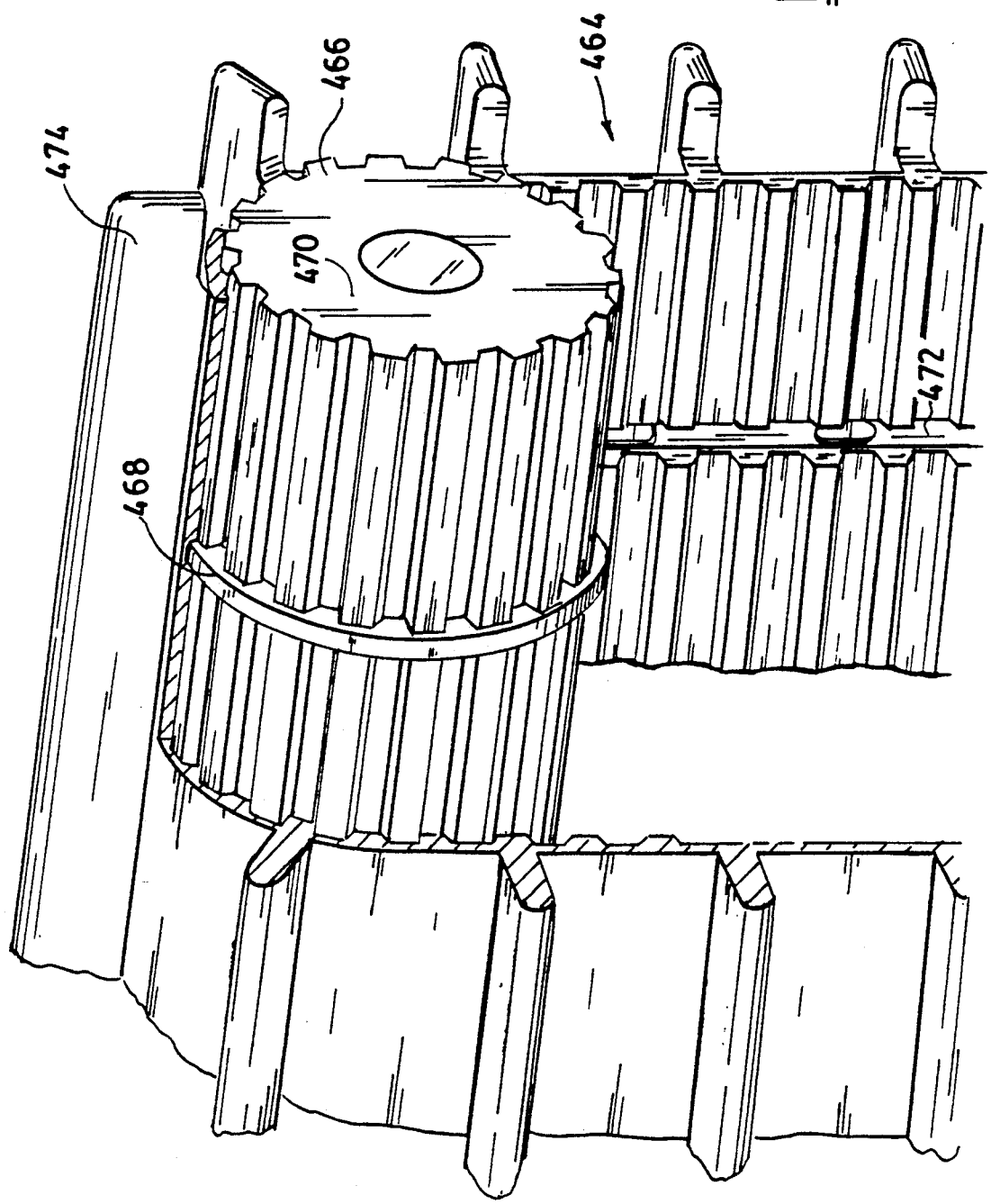
FIG. 21 is a partial perspective view of the cogbelt of FIG. 19 partially broken away illustrating the use of a flangeless pulley.

Referring to FIGS. 19, 20 and 21, there is illustrated yet another modified cogbelt 464 which is similar to cogbelt 364 illustrated in FIG. 18. However, in this embodiment instead of providing a continuous opening in the web portion of the cogbelt, a plurality of an individual spaced openings 476 are provided in vertical alignment to allow sensors 478 to be placed adjacent thereto to monitor the positioning and placement of a cassette disposed within the cassette site. In the particular embodiment illustrated, openings 476 have a generally elongated oval configuration. However, the configuration of openings 476 may take any desired shape.

Referring to FIG. 21, the use of a flangeless pulley 466 is illustrated which is used to drive the cogbelt 464. In this particular embodiment, a circumferentially extending projection 468 is provided on the pulley 466 at a point axially inward of the outer edge 470. The projection 468 is designed to be received in a mating longitudinally extending recess/groove 472 formed in the web of the cogbelt 464.

Figure 22:
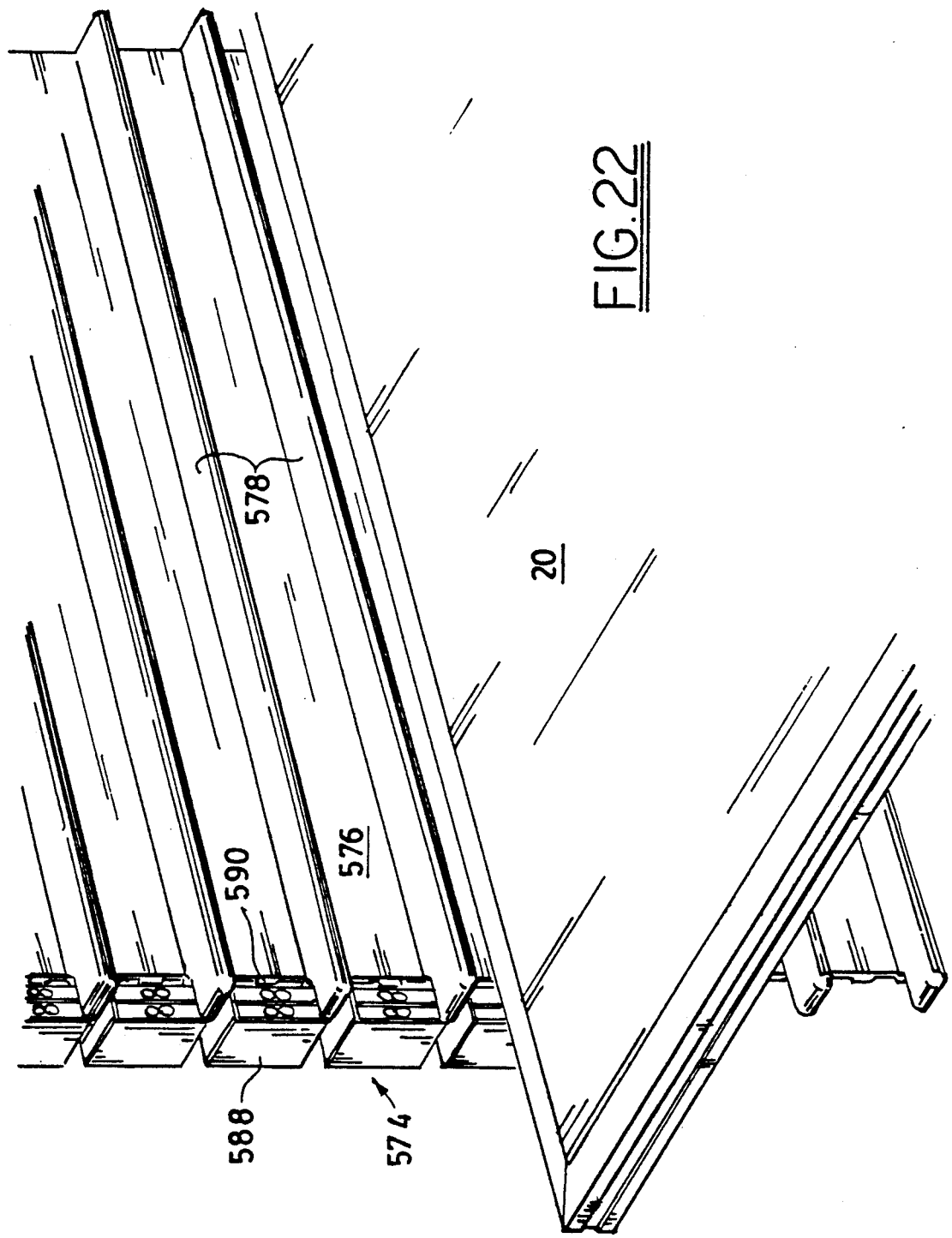
FIG. 22 is an enlarged partial perspective view of another modified cogbelt made in accordance with present invention with a cassette and one of the cassette sites.

Referring to FIG. 22, there is illustrated yet another modified cogbelt 574 which is again similar to cogbelt 64, like numerals indicating like parts. However, in this embodiment, instead of positioning the sensors within the web 576, a pair of adjacent sensors 588 are secured to rack 54 at a position axially outward of the outer edge 590. In this particular embodiment, the shelves 578 also extend past the outer edges 590 of the web 582.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto.

What is claimed is:

1. An x-ray cassette positioner for use with a plurality of x-ray cassettes, said cassette positioner comprising: first and second conveyors, said conveyors having a first endless cogbelt and a second endless cogbelt, respectively, said cogbelts being spaced apart, said cogbelts each having a plurality of outwardly extending shelves, said conveyors each having a pair of cogwheels, each said pair of cogwheels receiving a respective said cogbelt, said cogbelts each having a utilization segment and a return segment, said shelves of said utilization segment of said first cogbelt facing and being in vertical alignment with corresponding shelves of said utilization segment of said second cogbelt, said aligned shelves defining a cassette reader access site and a plurality of cassette loading sites, a positive drive operatively connected to both said conveyors, said positive drive capable of driving said conveyors in unison to transfer cassettes loaded in said loading sites serially through said loading sites and said read site, and a body encasing said conveyors, said body having a portal adjoining said cassette sites for allowing access to each of said plurality of loading sites for and allowing independent placement or removal of a cassette thereon.

2. The x-ray cassette positioner of claim 1 wherein said aligned shelves further define a plurality of cassette unloading sites, and said positive drive transfers cassettes loaded in said loading sites serially from said loading sites through said reader access site to said unloading sites.

3. The x-ray cassette positioner of claim 2 wherein said portal adjoins said plurality of loading sites, said reader access site, and said plurality of unloading sites.

4. The x-ray cassette positioner of claim 3 wherein said portal defines an operator station anterior to said portal and further comprising a table movable between a storage position and a use position, said table in said use position adjoining said portal and extending into said operator station, said table in said storage position being substantially displaced from said operator station.

5. The x-ray cassette positioner of claim 4 further comprising a door at said portal, means for selectively opening and closing said door, and means for moving said table between said storage and use positions on a selective basis in synchrony with and independently of said door.

6. The x-ray cassette positioner of claim 3 wherein said body has a base lowermost, at least ten loading sites and at least ten unloading sites and a monitor station disposed above said cassette sites, said monitor station being less than five feet above said base.

7. The x-ray cassette positioner of claim 6 wherein said cogbelts are timing belts.

8. The x-ray cassette positioner of claim 1 wherein said positive drive has a geared driveshaft and a pair of primary gears, said primary gears being operatively connected to respective said conveyors in positive relation, said primary gears being in reciprocal engagement with said driveshaft.

9. The x-ray cassette positioner of claim 1 wherein said first conveyor is movable relative to said second conveyor from a first position to a second position, said first conveyor being in operational relation with said positive drive in said first position and in said second position.

10. The x-ray cassette positioner of claim 9 wherein said first conveyor is continuously in operational relation with said positive drive during movement from said first position to said second position.

11. The x-ray cassette positioner of claim 9 further comprising a pair of racks, each rack supporting a respective said conveyor, each said rack depending from said body, said rack of said first conveyor being movable relative to said body to move said first conveyor relative to said second conveyor from said first position to said second position.

12. An x-ray cassette positioner of claim 1 wherein said aligned shelves have means for holding cassettes of more than one size securely in position in at least one of said cassette sites.

13. An x-ray cassette positioner of claim 12 wherein said means for holding cassettes of more than one size comprises said shelves each having an upper support surface and lower support surface, wherein said upper support surface extends from said cogbelt and terminates in an outer end, said lower support surface extends from said outer end and forms a registration surface at their juncture, said registration surface providing a guide for placement of a cassette smaller in size than a cassette designed for placement on said upper support surface.

14. An x-ray cassette positioner of claim 1 wherein said shelves extend axially past the edges of the web of the cogbelt on which it is secured.

15. An x-ray cassette positioner of claim 1 further comprising means for monitoring an aspect of a cassette placed in at least one of said cassette sites.

16. An x-ray cassette positioner according to claim 15 wherein said means for monitoring an aspect of said cassette comprises at least one sensor disposed at a position such that it can monitor the cassettes placed in said cassette sites.

17. An x-ray cassette positioner according to claim 1 wherein a pair of endless cogbelts are placed on each of said conveyors.

18. An x-ray cassette positioner for use with a plurality of x-ray cassettes, said cassette positioner comprising: first and second conveyors, said conveyors having a first endless cogbelt and a second endless cogbelt, respectively, said cogbelts being spaced apart, said cogbelts each having a plurality of outwardly extending shelves, said conveyors each having a pair of cogwheels, each said pair of cogwheels receiving a respective said cogbelt, said cogbelts each having a utilization segment and a return segment, said shelves of said utilization segment of said first cogbelt facing and being in vertical alignment with corresponding shelves of said utilization segment of said second cogbelt, said aligned shelves defining a cassette reader access sites, a plurality of cassette loading sites, and a plurality of cassette unloading sites, each said conveyor having a primary gear operatively connected to a respective said cogbelt, and a driveshaft, said driveshaft having a pair of spaced apart shaft gears, said shaft gears being in reciprocal engagement with respective said primary gears, to drive both said conveyors in unison and transfer cassettes loaded in said loading sites serially from said loading sites through said reader access site to said unloading sites, having a portal adjoining said cassette site for and allowing access to each of said plurality of loading sites and allowing independent placement or removal of a cassette thereon.

19. The x-ray cassette positioner of claim 18 wherein said driveshaft has a secondary gear disposed in spaced relation to said primary gears, and one of said conveyors is alternately engageable to one of said primary gears and said secondary gear.

20. The x-ray cassette positioner of claim 19 wherein said primary gears are worm gears and said shaft and secondary gears are worms.

21. The x-ray cassette positioner of claim 20 wherein one of said shaft gears and said secondary gear form a continuous worm.

22. The x-ray cassette positioner of claim 18 further comprising means for braking downward movement of said conveyors.

23. An endless cogbelt for use on an x-ray cassette positioner having a first and second conveyor, each of the conveyors being designed to receive at least one said endless cogbelt, said conveyors having means for moving the cogbelts in unison to allow cassettes to be moved in a vertical direction by said cogbelts, said cogbelt comprising an endless web, a plurality of outwardly extending shelves secured to said web and spaced apart along the length of said endless web such that the shelves form a plurality of cassette sites between said conveyors, said shelves having means for holding cassettes of more than one size securely at a predetermined position in at least one of said cassette sites.

24. An endless cogbelt according to claim 23 wherein said means for holding cassettes of more than one size comprises, said shelves having an upper support surface extending from said web and terminating in an outer end, and a lower support surface disposed below said upper support surface which forms a registration surface at their juncture, said registration surface providing guide means for placement of a cassette of a size smaller in size than a cassette designed to be supported by said upper support surface.

25. An endless cogbelt according to claim 23 wherein said shelves extend past the edges of the web of said cogbelt.

* * * * *